(12) United States Patent
Comeau et al.

(10) Patent No.: US 12,440,288 B2
(45) Date of Patent: Oct. 14, 2025

(54) ARTICULATED POSITIONING SYSTEM FOR A SCIENTIFIC OR MEDICAL TOOL, ROBOTIZED POSITIONING ASSEMBLY COMPRISING SAME AND CORRESPONDING METHOD

(71) Applicant: ROGUE RESEARCH INC., Montreal (CA)

(72) Inventors: Roch M. Comeau, Montreal (CA); Mathieu Coursolle, Terrebonne (CA)

(73) Assignee: ROGUE RESEARCH INC. (CA)

( * ) Notice: Subject to any disclaimer, the term of this patent is extended or adjusted under 35 U.S.C. 154(b) by 352 days.

(21) Appl. No.: 18/012,748

(22) PCT Filed: Jun. 25, 2021

(86) PCT No.: PCT/CA2021/050877
§ 371 (c)(1),
(2) Date: Dec. 23, 2022

(87) PCT Pub. No.: WO2021/258217
PCT Pub. Date: Dec. 30, 2021

(65) Prior Publication Data
US 2023/0248451 A1   Aug. 10, 2023

Related U.S. Application Data

(60) Provisional application No. 63/043,940, filed on Jun. 25, 2020.

(51) Int. Cl.
*A61B 34/30* (2016.01)
*A61B 34/10* (2016.01)
(Continued)

(52) U.S. Cl.
CPC .............. *A61B 34/30* (2016.02); *A61B 34/10* (2016.02); *A61B 90/50* (2016.02); *A61N 2/006* (2013.01);
(Continued)

(58) Field of Classification Search
CPC ......... A61B 34/30; A61B 34/10; A61B 90/50; A61B 2034/304; A61B 2034/305;
(Continued)

(56) References Cited

U.S. PATENT DOCUMENTS 6,024,576 A * 2/2000 Bevirt .................... G06F 3/016
345/184
8,303,478 B2   11/2012 Lebosse et al.
(Continued)

FOREIGN PATENT DOCUMENTS

| EP | 0358765 B1 | 7/1995 |
|---|---|---|
| WO | WO8902349 A1 | 3/1989 |
| WO | WO2009040677 A2 | 4/2009 |

OTHER PUBLICATIONS

International Search Report for PCT/CA2021/050877 dated Oct. 18, 2021.

*Primary Examiner* — Kira Nguyen
(74) *Attorney, Agent, or Firm* — Reed Smith LLP; Amardeep S. Grewal

(57) ABSTRACT

The present disclosure concerns an articulated positioning system for positioning a scientific tool in predetermined position and orientation with respect to a head of a subject, the articulated positioning system comprising: a spherical robot arm assembly defining an arm displacement sphere, the spherical robot arm assembly comprising: a proximal arm segment comprising a base-mounting end portion connectable to a support structure and an opposed distal segment-mounting end portion, the proximal arm segment forming a proximal arc of the arm displacement sphere; and
(Continued)

a distal arm segment comprising a proximal segment-mounting end portion pivotally mounted to the distal segment-mounting end portion about an arm segment connection axis and an opposed tool-holding end portion, the distal arm segment forming a distal arc of the arm displacement sphere. It also concerns a corresponding robotized positioning assembly and a corresponding method for positioning the tool in the predetermined position and orientation.

19 Claims, 12 Drawing Sheets

(51) Int. Cl.
    *A61B 90/50*         (2016.01)
    *A61N 2/00*         (2006.01)

(52) U.S. Cl.
    CPC ... *A61B 2034/304* (2016.02); *A61B 2034/305* (2016.02)

(58) Field of Classification Search
    CPC ........ A61N 2/006; A61N 5/01; A61N 5/0622; B25J 18/007
    USPC ..................................................... 700/245
    See application file for complete search history.

(56) References Cited

U.S. PATENT DOCUMENTS

| | | |
|---|---|---|
| 2005/0228209 A1 | 10/2005 | Schneider et al. |
| 2006/0161039 A1 | 7/2006 | Juliana et al. |
| 2007/0137371 A1* | 6/2007 | Devengenzo .......... A61B 34/30 74/490.01 |
| 2007/0173788 A1 | 7/2007 | Schena |
| 2007/0173976 A1 | 7/2007 | Schena |
| 2007/0173977 A1* | 7/2007 | Schena ................... A61B 34/70 700/263 |
| 2009/0041565 A1 | 2/2009 | Rodriguez Y Baena |
| 2009/0216067 A1 | 8/2009 | Lebosse et al. |
| 2009/0234369 A1* | 9/2009 | Bax ........................ A61B 34/30 606/130 |
| 2010/0017035 A1* | 1/2010 | Van Den Berg .......... B66C 3/02 700/259 |
| 2014/0378994 A1* | 12/2014 | Wang ...................... F16H 21/54 606/130 |
| 2015/0297299 A1* | 10/2015 | Yeung .................... A61B 34/30 600/102 |
| 2017/0165847 A1 | 6/2017 | Popovic et al. |
| 2018/0140377 A1* | 5/2018 | Reichenbach ...... A61B 1/00149 |

* cited by examiner

ARTICULATED POSITIONING SYSTEM FOR A SCIENTIFIC OR MEDICAL TOOL, ROBOTIZED POSITIONING ASSEMBLY COMPRISING SAME AND CORRESPONDING METHOD

PRIOR APPLICATION

This is a 371 of International Patent Application No. PCT/CA2021/050877 filed on Jun. 25, 2021, and entitled "ARTICULATED POSITIONING SYSTEM FOR A SCIENTIFIC OR MEDICAL TOOL, ROBOTIZED POSITIONING ASSEMBLY COMPRISING SAME AND CORRESPONDING METHOD", and claims the benefit under 35 U.S.C. § 119 (e) of the earlier filing date of United States Provisional Patent Application No. 63/043,940, filed on Jun. 25, 2020, and entitled "ARTICULATED POSITIONING SYSTEM FOR A SCIENTIFIC OR MEDICAL TOOL AND ROBOTIZED POSITIONING ASSEMBLY COMPRISING SAME", the disclosure of each are being hereby incorporated by reference in their entirety.

TECHNICAL FIELD

The technical field relates to positioning systems for tools, and more particularly to articulated positioning systems for scientific or medical tools, and to robotized positioning assemblies comprising same and to corresponding methods.

BACKGROUND

There are numerous situations in which it is important to position a tool (such as a scientific or medical tool) accurately and/or repeatedly in a predetermined orientation and/or in a predetermined location with respect to a subject, for instance a medical patient or a research subject.

One example of situations in which it is important to position a scientific or medical tool accurately and consistently in predetermined orientation and location with respect to the subject is in the context of Transcranial Magnetic Stimulation (TMS) techniques. Such techniques are used in medical applications and the like. TMS techniques require an electromagnetic coil to be accurately placed on or in the vicinity of a head scalp of the subject and operated to effect electromagnetic stimulations of a specifically targeted brain structure.

In TMS (or fUS—focused ultrasounds) techniques, the coil or transducer (referred in this context as the tool) is usually manipulated and positioned manually by an operator using either a predefined marker on the subject head scalp, or a navigation system. Once the tool is positioned at the right location and orientation, the operator will either try to keep the tool in place or attach the tool to a static holder to keep the tool in place. This method has the disadvantage of a potential inaccuracy caused by the operator fatigue and/or attention for long protocols (e.g., several minutes) or caused by subject movements. This potential inaccuracy could lead to inaccurate results in the case of a research study and/or treatment. Existing systems might neither be able to position such a medical or scientific tool in predetermined location and position accurately and/or consistently, and/or might be cumbersome and/or expensive to manufacture and/or to maintain. Moreover, existing systems might be expensive and/or provide a small working space and/or provide an uncomfortable management of contact between the tool and the subject head and/or might not allow a complete automation.

In view of the above, there is a need for an articulated positioning system which would be able to overcome or at least minimize some of the above-discussed prior art concerns.

BRIEF SUMMARY

It is therefore an aim of the present invention to address the above-mentioned issues.

According to a general aspect of the disclosure, there is provided an articulated positioning system for positioning a scientific or medical tool in at least one of a predetermined position and a predetermined orientation with respect to a head of a subject, the articulated positioning system being connectable to a support structure and comprising: a spherical robot arm assembly defining an arm displacement sphere having a center, the spherical robot arm assembly comprising: a proximal arm segment comprising a base-mounting end portion connectable to the support structure and an opposed distal segment-mounting end portion, the proximal arm segment forming a proximal arc of the arm displacement sphere; and a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere.

In some embodiments, at least one of the proximal and distal arcs subtends an angle comprised between about 30 degrees and about 60 degrees.

In some embodiments, the angles subtended by the proximal and distal arcs are equal and measure about 45 degrees.

In some embodiments, the proximal arm segment has a proximal arm length substantially equal to a distal arm length of the distal arm segment.

In some embodiments, the arc segment connection axis intersects the center of the arm displacement sphere.

In some embodiments, the articulated positioning system comprises a tool-holding assembly mounted to the tool-holding end portion of the distal arm segment, the tool-holding assembly comprising a tool-receiving portion and at least one tool-pivoting device having at least one tool-pivoting axis, wherein when the scientific or medical tool is engaged with the tool-receiving portion, the scientific or medical tool is pivotable about said at least one tool-pivoting axis.

In some embodiments, the tool-holding assembly comprises first and second tool-pivoting devices having respectively first and second tool-pivoting axes intersecting each other, wherein, when the scientific or medical tool is engaged with the tool-receiving portion, the scientific or medical tool is pivotable about the first and second tool-pivoting axes.

In some embodiments, the first and second tool-pivoting axes are substantially perpendicular to each other.

In some embodiments, the tool-holding assembly further comprises a tool-translating device defining a tool-translating axis, wherein in use, the scientific or medical tool is translatable along the tool-translating axis.

In some embodiments, the tool-translating axis intersects the first and second tool-pivoting axes.

In some embodiments, the tool-holding assembly comprises a third tool-pivoting device having a third tool-pivoting axis, wherein in use, the scientific or medical tool is pivotable about the third tool-pivoting axis.

In some embodiments, the third tool-pivoting axis intersects the first and second tool-pivoting axes.

In some embodiments, the third tool-pivoting axis is substantially parallel to the tool-translating axis.

In some embodiments, the tool-holding assembly further comprises a suspension device operatively coupled to the tool-translating device.

In some embodiments, the base-mounting end portion of the proximal arm segment is pivotally connectable to the support structure about a base-mounting rotation axis.

In some embodiments, the base-mounting rotation axis intersects the center of the arm displacement sphere.

In some embodiments, the articulated positioning system comprises an arm-supporting assembly comprising an arm-mounting portion mounted to the base-mounting end portion of the proximal arm segment, and a support-mounting portion mountable to the support structure.

In some embodiments, the support-mounting portion is pivotally mountable to the support structure about a support-mounting rotation axis.

In some embodiments, the support-mounting rotation axis is substantially perpendicular to the base-mounting rotation axis.

In some embodiments, the arm-supporting assembly comprises a plurality of articulated base segments arranged between the arm-mounting portion and the support-mounting portion.

In some embodiments, at least two of said plurality of articulated base segments are pivotally mounted to each other about corresponding base segment connection axes.

In some embodiments, said plurality of base segment connection axes are substantially parallel to each other.

In some embodiments, said plurality of base segments comprises a distal base segment comprising the arm-mounting portion, a proximal base segment comprising the support-mounting portion and at least one intermediate base segment arranged between the distal base segment and the proximal base segment.

In some embodiments, at least one of said base segment connection axes is substantially perpendicular to at least one of the support-mounting rotation axis and the base-mounting rotation axis.

In some embodiments, the arm-supporting assembly comprises a plurality of arm-supporting members arranged between the arm-mounting portion and the support-mounting portion.

In some embodiments, said plurality of arm-supporting members comprises a distal arm-supporting member comprising the arm-mounting portion and a proximal arm-supporting member comprising the support-mounting portion.

In some embodiments, the proximal and distal arm-supporting members extend along substantially perpendicular longitudinal directions.

In some embodiments, at least one of said plurality of arm-supporting members comprises a telescopic assembly.

In some embodiments, the distal arm-supporting member comprises a distal telescopic assembly to translate the arm-mounting portion along the longitudinal direction of the distal arm-supporting member.

In some embodiments, the articulated positioning system is for positioning a transcranial magnetic stimulation probe at or around the head of the subject.

According to another general aspect of the disclosure, there is provided a robotized positioning assembly for positioning a scientific or medical tool in at least one of a predetermined position and a predetermined orientation with respect to a head of a subject, the robotized positioning assembly being connectable to a support structure and comprising an articulated positioning system comprising: a spherical robot arm assembly defining an arm displacement sphere having a center, the spherical robot arm assembly comprising: a proximal arm segment comprising a base-mounting end portion connectable to the support structure and an opposed distal segment-mounting end portion, the proximal arm segment forming a proximal arc of the arm displacement sphere; and a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere; a head position-determining system to determine a head position of the subject; a calculation device to determine target positions of the proximal and distal arm segments as a function of the head position and the at least one of a predetermined position and a predetermined orientation; and a controller operatively coupled to the articulated positioning system to position said proximal and distal arm segments in said determined target positions thereof wherein, when the scientific or medical tool is mounted to the tool-holding end portion of the distal arm segment, said scientific or medical tool is in said at least one of a predetermined position and a predetermined orientation with respect to the head of the subject.

In some embodiments, the articulated positioning system further comprises a tool-holding assembly mounted to the tool-holding end portion of the distal arm segment, the tool-holding assembly comprising a tool-receiving portion and at least one tool-pivoting device having at least one tool-pivoting axis, wherein the calculation device is configured to determine at least one target tool-pivoting angle as a function of the head position and the at least one of a predetermined position and a predetermined orientation; and wherein the controller is operatively coupled to the tool-holding assembly to actuate said at least one tool-pivoting device as a function of said at least one determined target tool-pivoting angle.

In some embodiments, the tool-holding assembly comprises first and second tool-pivoting devices having respectively first and second tool-pivoting axes intersecting each other, wherein the calculation device is configured to determine first and second target tool-pivoting angles as a function of the head position and the at least one of a predetermined position and a predetermined orientation.

In some embodiments, the tool-holding assembly further comprises a tool-translating device defining a tool-translating axis, wherein the calculation device is configured to determine a target tool-translating position as a function of the head position and the at least one of a predetermined position and a predetermined orientation; and wherein the controller is operatively coupled to the tool-holding assembly to actuate said tool-translating device as a function of said at least one determined target tool-translating position angle.

In some embodiments, the tool-holding assembly comprises a third tool-pivoting device having a third tool-pivoting axis, wherein the calculation device is configured to determine a third target tool-pivoting angle as a function of the head position and the at least one of a predetermined position and a predetermined orientation.

In some embodiments, the base-mounting end portion of the proximal arm segment is pivotally connectable to the support structure about a base-mounting rotation axis; wherein the calculation device is configured to determine a target base-mounting rotation angle as a function of the head position and the at least one of a predetermined position and a predetermined orientation; and wherein the controller is operatively coupled to the articulated positioning system to pivot the base-mounting end portion of said proximal arm segment as a function of the determined target base-mounting rotation angle.

In some embodiments, the support-mounting portion is pivotally mountable to the support structure about a support-mounting rotation axis; wherein the calculation device is configured to determine a target support-mounting rotation angle as a function of the head position and the at least one of a predetermined position and a predetermined orientation; and wherein the controller is operatively coupled to the arm-supporting assembly to pivot said support-mounting portion as a function of the determined target support-mounting rotation angle.

In some embodiments, at least two of said plurality of articulated base segments are pivotally mounted to each other about corresponding base segment connection axes; wherein the calculation device is configured to determine corresponding target base segment connection angles as a function of the head position and the at least one of a predetermined position and a predetermined orientation; and wherein the controller is operatively coupled to the arm-supporting assembly to pivot said at least two of said plurality of articulated base segments as a function of said determined corresponding target base segment connection angles.

In some embodiments, the distal arm-supporting member comprises a distal telescopic assembly to translate the arm-mounting portion along the longitudinal direction of the distal arm-supporting member; wherein the calculation device is configured to determine a target arm-mounting portion position as a function of the head position and the at least one of a predetermined position and a predetermined orientation; and wherein the controller is operatively coupled to the arm-supporting assembly to actuate said distal telescopic assembly as a function of the determined target arm-mounting portion position.

According to another general aspect of the disclosure, there is provided a method for positioning a scientific or medical tool in at least one of a predetermined position and a predetermined orientation with respect to a head of a subject, the method comprising: providing an articulated positioning system connectable to a support structure and comprising a spherical robot arm assembly defining an arm displacement sphere having a center, the spherical robot arm assembly comprising: a proximal arm segment comprising a base-mounting end portion connectable to the support structure and an opposed distal segment-mounting end portion, the proximal arm segment forming a proximal arc of the arm displacement sphere; and a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere; engaging said scientific or medical tool with said tool-holding end portion; arranging the articulated positioning system for the head of the subject to be at least partially disposed within the arm displacement sphere; and displacing at least one of the proximal and distal arm segments for said scientific or medical tool to be in said at least one of a predetermined position and a predetermined orientation.

In some embodiments, the articulated positioning system comprises a tool-holding assembly mounted to the tool-holding end portion of the distal arm segment, the tool-holding assembly comprising a tool-receiving portion and at least one tool-pivoting device having at least one tool-pivoting axis, the method further comprising: engaging said scientific or medical tool with said tool-receiving portion; actuating said at least one tool-pivoting device to pivot said scientific or medical tool about said at least one tool-pivoting axis.

In some embodiments, the tool-holding assembly comprises first and second tool-pivoting devices having respectively first and second tool-pivoting axes intersecting each other, the method comprising actuating at least one of said first and second tool-pivoting devices to pivot said scientific or medical tool about the corresponding one of said first and second tool-pivoting axes.

In some embodiments, the tool-holding assembly further comprises a tool-translating device defining a tool-translating axis, the method further comprising actuating said tool-translating device to translate said scientific or medical tool along said tool-translating axis.

In some embodiments, the tool-holding assembly comprises a third tool-pivoting device having a third tool-pivoting axis substantially parallel to the tool-translating axis, the method further comprising actuating said third pivoting device to pivot said scientific or medical tool about the third tool-pivoting axis.

In some embodiments, the base-mounting end portion of the proximal arm segment is pivotally connectable to the support structure about a base-mounting rotation axis, the method comprising pivoting the proximal arm segment about the base-mounting rotation axis.

In some embodiments, the articulated positioning system comprises an arm-supporting assembly comprising an arm-mounting portion mounted to the base-mounting end portion of the proximal arm segment, and a support-mounting portion pivotally mountable to the support structure about a support-mounting rotation axis, the method further comprising pivoting the support-mounting portion about said support-mounting rotation axis.

In some embodiments, the arm-supporting assembly comprises a plurality of articulated base segments arranged between the arm-mounting portion and the support-mounting portion, the method comprising at least one of displacing and pivoting a portion of at least one of said plurality of articulated base segments with respect to the other ones.

In some embodiments, said scientific or medical tool is a transcranial magnetic stimulation (TMS) probe, the method comprising placing sequentially the TMS probe over a series of different targets of the head of the user.

According to another general aspect, there is provided n articulated positioning system for positioning a scientific or medical tool in at least one of a predetermined position and a predetermined orientation with respect to a head of a subject, the articulated positioning system comprising: a robotized arm assembly connectable to a support structure, the robotized arm assembly comprising: a proximal arm segment, comprising a base-mounting end portion and an opposed distal segment-mounting end portion, the proximal arm segment forming a proximal arc of an arm displacement sphere having a center; and a distal arm segment, comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere.

According to another general aspect, there is provided a robotized positioning assembly, comprising: an articulated positioning system according to the present disclosure; a head position-determining system to determine a head position of the subject; a calculation device to determine the positions of the proximal and distal arm segments as a function of the head position; and a controller operatively coupled to the articulated positioning system to pivot at least one of the proximal and distal arm segments as a function of the determined positions thereof.

According to yet another general aspect, there is provided a method for positioning a scientific or medical tool in at least one of a predetermined position and a predetermined orientation with respect to a head of a subject, the method comprising: providing an articulated positioning system comprising a robotized arm assembly connectable to a support structure, the robotized arm assembly comprising: a proximal arm segment, comprising a base-mounting end portion and an opposed distal segment-mounting end portion, the proximal arm segment forming a proximal arc of an arm displacement sphere having a center; and a distal arm segment, comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere. The method comprises arranging the articulated positioning system for the head of the subject to be disposed within the arm displacement sphere; determining a projected location of the predetermined position of the head of the subject on the arm displacement sphere; and displacing at least one of the proximal and distal arm segments for the tool-holding end portion to be placed at the projected location.

Other possible aspect(s), object(s), embodiment(s), variant(s) and/or advantage(s) of the present invention, all being preferred and/or optional, are briefly summarized hereinbelow.

DETAILED DESCRIPTION

Figure 1A:
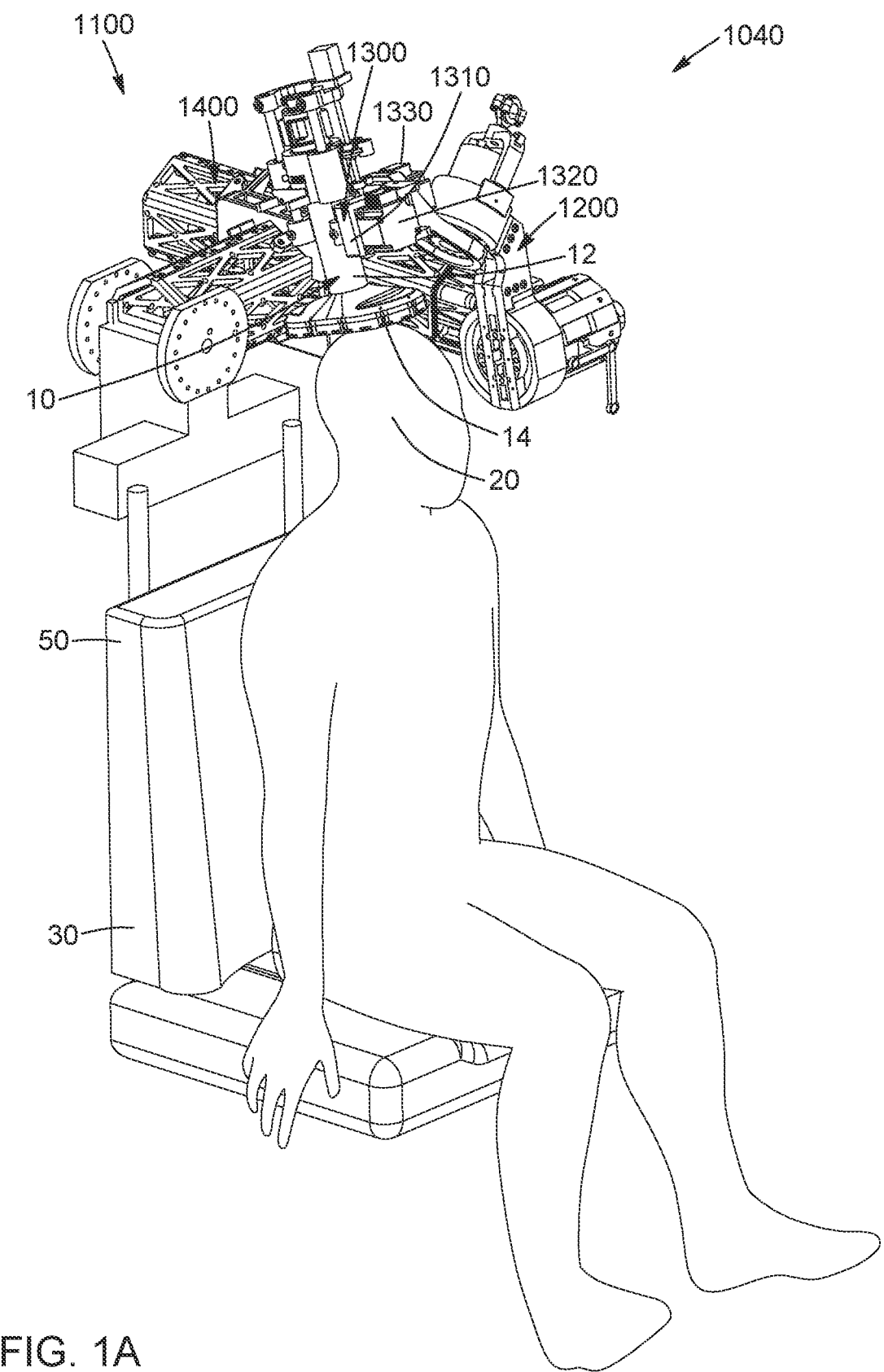
FIG. 1A is a front perspective view of a robotized positioning assembly comprising an articulated positioning system in accordance with a first embodiment, the articulated positioning system comprising an arm-supporting assembly, a spherical robot arm assembly and a tool-holding assembly.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the articulated positioning system and of the robotized positioning assembly comprising such an articulated positioning system and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Articulated Positioning System

Referring now to the drawings, and more particularly to FIGS. 1A to 3B, there is shown an articulated positioning system 1100 in accordance with a first embodiment. The articulated positioning system 1100 is for positioning a scientific or medical tool 10 (FIGS. 3A and 3B) in at least one of a predetermined position and a predetermined orientation with respect to a head 20 of a subject. In the embodiment shown, the articulated positioning system 1100 comprises a robotized arm assembly 1200 (or spherical robot arm assembly 1200) connectable—either directly or indirectly, as in the embodiment shown—to a support structure 50. The support structure can be, for instance, a mechanical structure, a static holder, a portion of a wall and/or ground in the vicinity of the subject or a portion a chair-supporting structure.

Figure 3A:
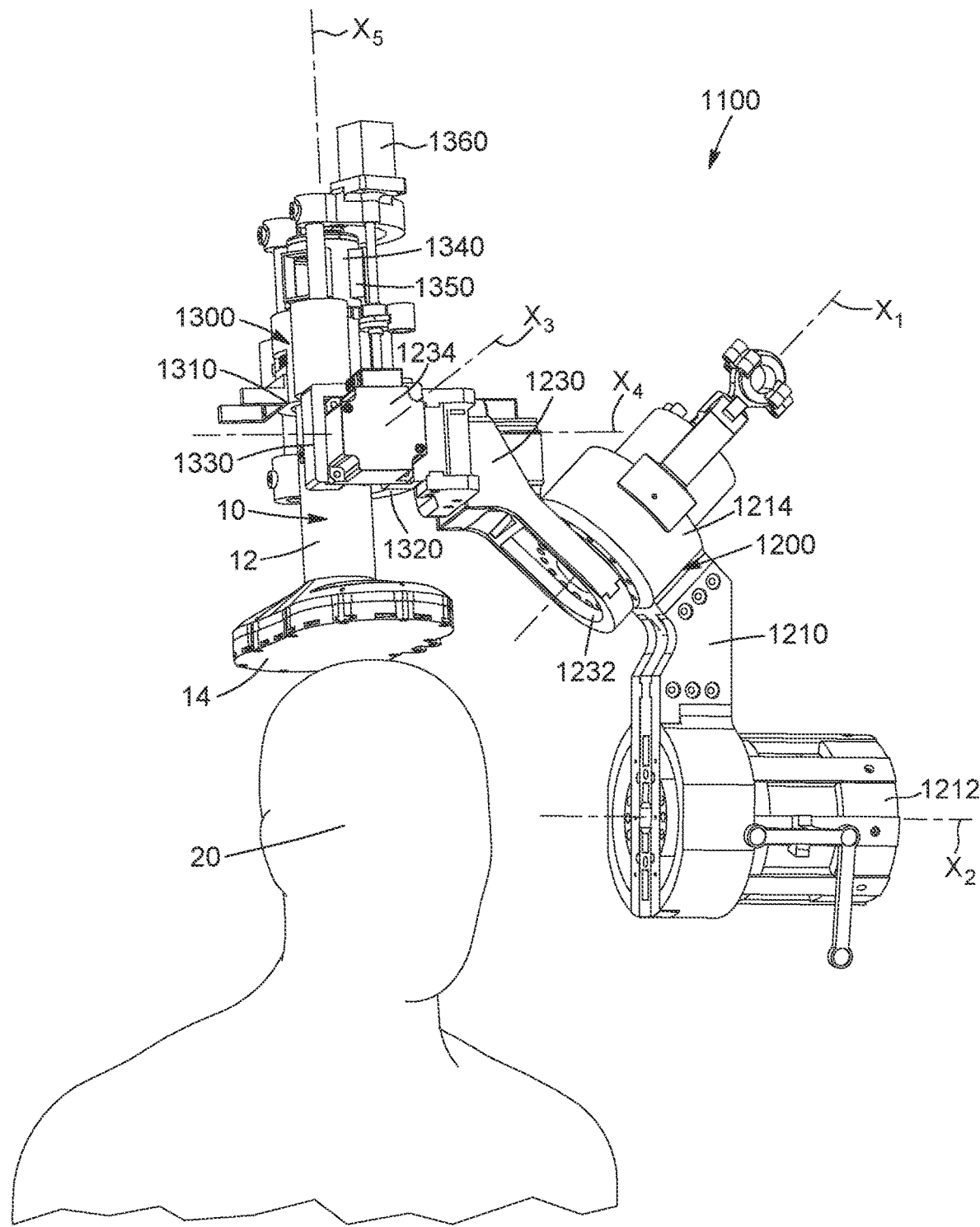
FIG. 3A is a front perspective view of the articulated positioning system of FIG. 1, the tool-holding assembly holding a scientific or medical tool onto a head of a subject.
Figure 3B:
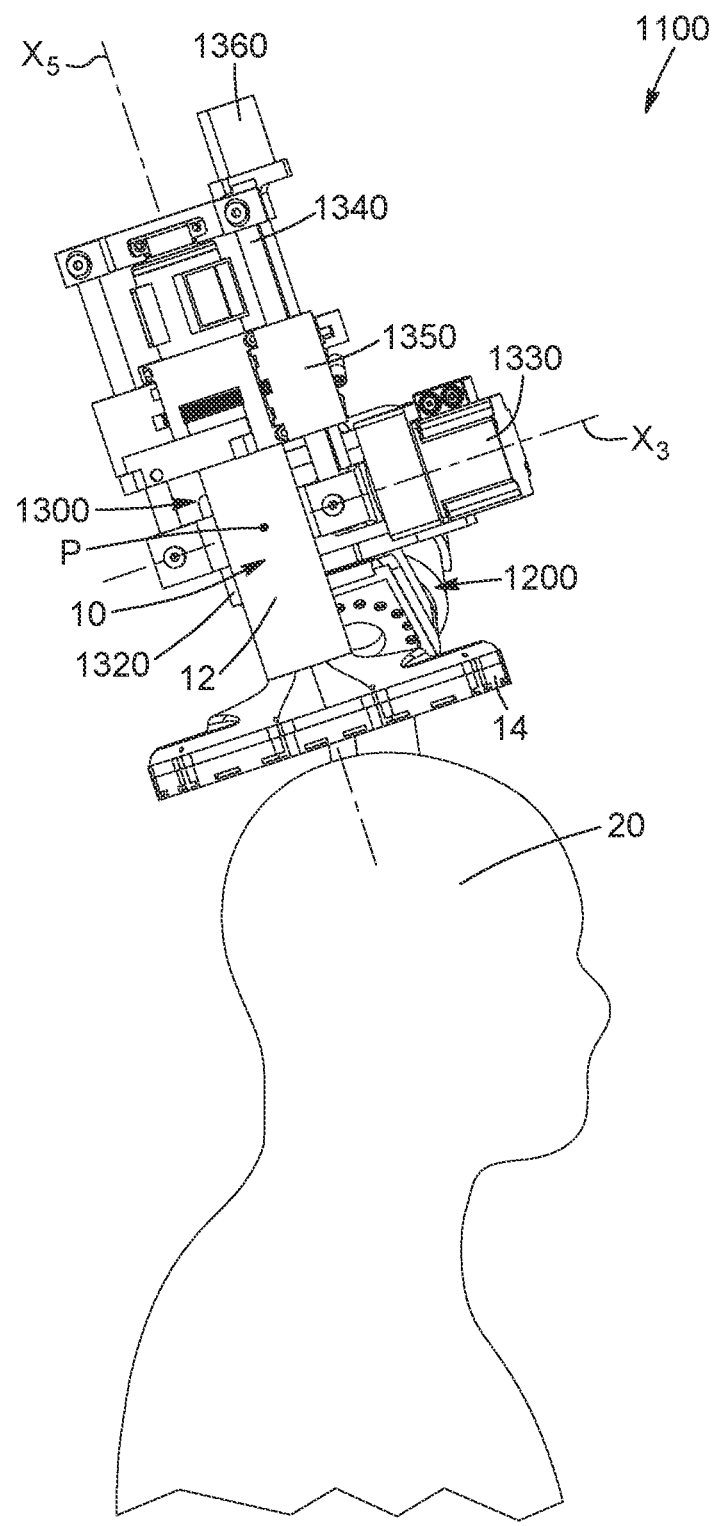
FIG. 3B is a side elevational view of the articulated positioning system of FIG. 3A.

Referring to FIGS. 3A and 3B, in the embodiment shown, the robotized arm assembly 1200 comprises a proximal arm segment 1210, comprising a base-mounting end portion 1212 and an opposed distal segment-mounting end portion 1214. The robotized arm assembly 1200 further comprises a distal arm segment 1230, comprising a proximal segment-mounting end portion 1232 pivotally mounted to the distal segment-mounting end portion 1214 of the proximal arm segment 1210 about an arm segment connection axis X1. The distal arm segment 1230 further comprises an opposed tool-holding end portion 1234.

Figure 4:
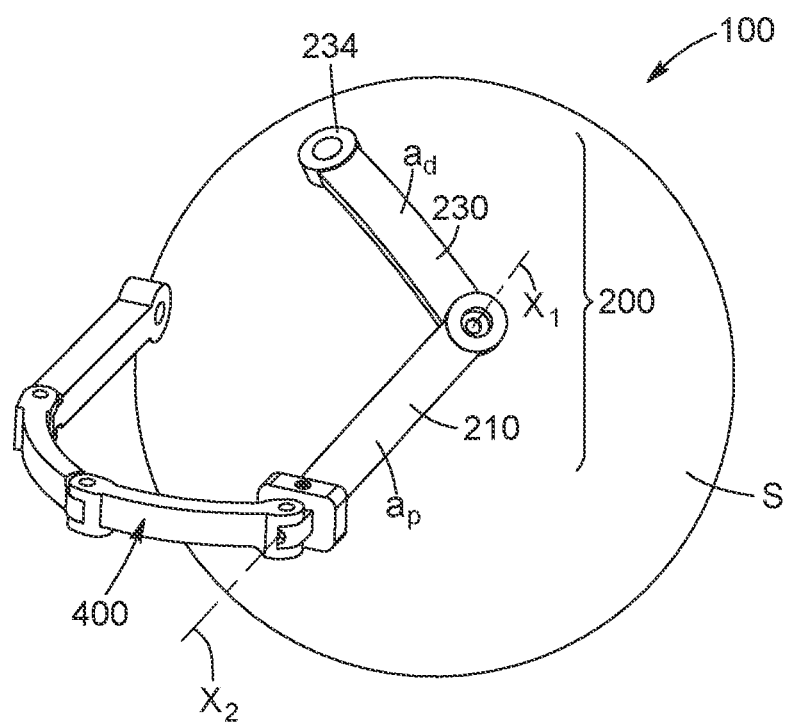
FIG. 4 is a side perspective view of an articulated positioning system in accordance with a second embodiment, the articulated positioning system comprising an arm-supporting base and a robotized arm assembly defining an arm displacement sphere.
Figure 5:
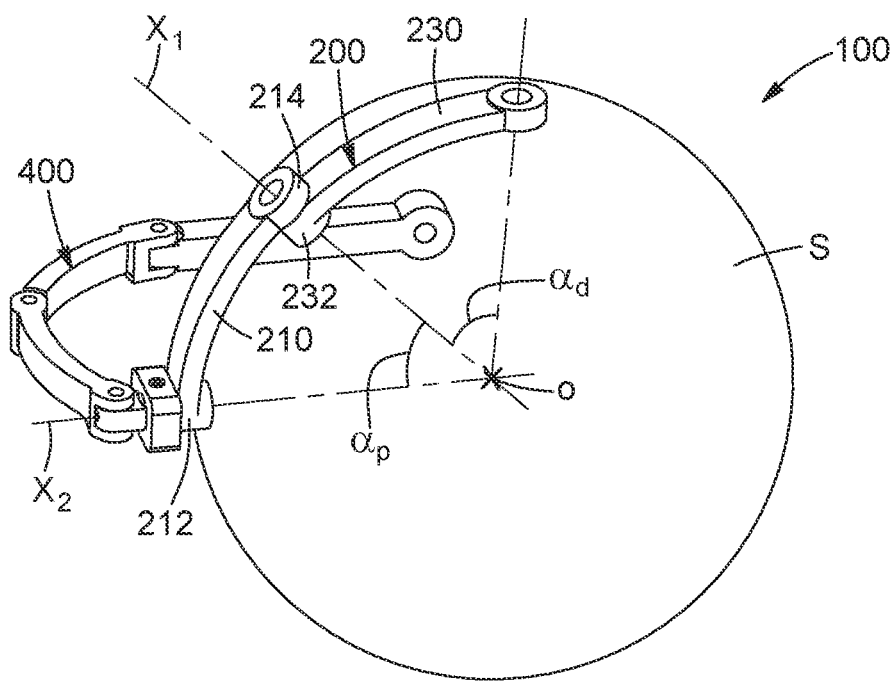
FIG. 5 is a front perspective view of the articulated positioning system of FIG. 4.

As best shown in FIGS. 4 and 5 which represent an articulated positioning system 100 in accordance with a second possible embodiment, the proximal arm segment 210 of the robotized arm assembly 200 forms substantially a proximal arc ap of an arm displacement sphere S having a center o. The distal arm segment 230 forms a distal arc ad of the arm displacement sphere S.

In the following description, unless otherwise stated, the terms distal and proximal should be understood with respect to the support structure 50.

In the non-limitative embodiments shown, the articulated positioning system 100, 1100 is for positioning a transcranial magnetic stimulation probe 10 at or around the head 20 of the subject. The overall goal of the present disclosure is thus to provide a system that can hold the scientific or medical tool 10 (such as for instance and without being limitative a TMS—Transcranial Magnetic Stimulation—stimulator coil, a fUS—focused ultrasounds—transducer or any other non-invasive brain stimulation—NBIS—tool) over a specific location of a section of a scalp of the head 20 and to point the tool 10 accurately (i.e., in a pre-determined orientation) to a pre-specified target of the head 20 of the subject. The articulated positioning system 100, 1100 is also configured to place the tool 10 over a series of targets in sequence and orient the tool 10 to reach any target that the tool 10 is capable of reaching and that the user of the articulated positioning system 100, 1100 may want to manipulate.

Robotized Arm Assembly (or Spherical Robot Arm Assembly)

As represented in FIG. 5, the proximal arc ap and the distal arc ad subtend respectively a proximal angle $\alpha p$ and a distal angle $\alpha d$. In the embodiment shown, at least one of the proximal and distal angles $\alpha p$, $\alpha d$ which are subtended respectively by the proximal and distal arcs ap, ad is comprised between about 20 degrees and about 70 degrees. In another embodiment, at least one of the proximal and distal angles $\alpha p$, $\alpha d$ is comprised between about 30 degrees and about 60 degrees. In another embodiment, at least one of the proximal and distal angles $\alpha p$, $\alpha d$ is comprised between about 40 degrees and about 50 degrees. In another embodiment, at least one of the proximal and distal angles $\alpha p$, $\alpha d$ measures about 45 degrees. In the embodiment shown, the proximal and distal angles $\alpha p$, $\alpha d$ have substantially equal values and measure both about 45 degrees.

Figure 11:
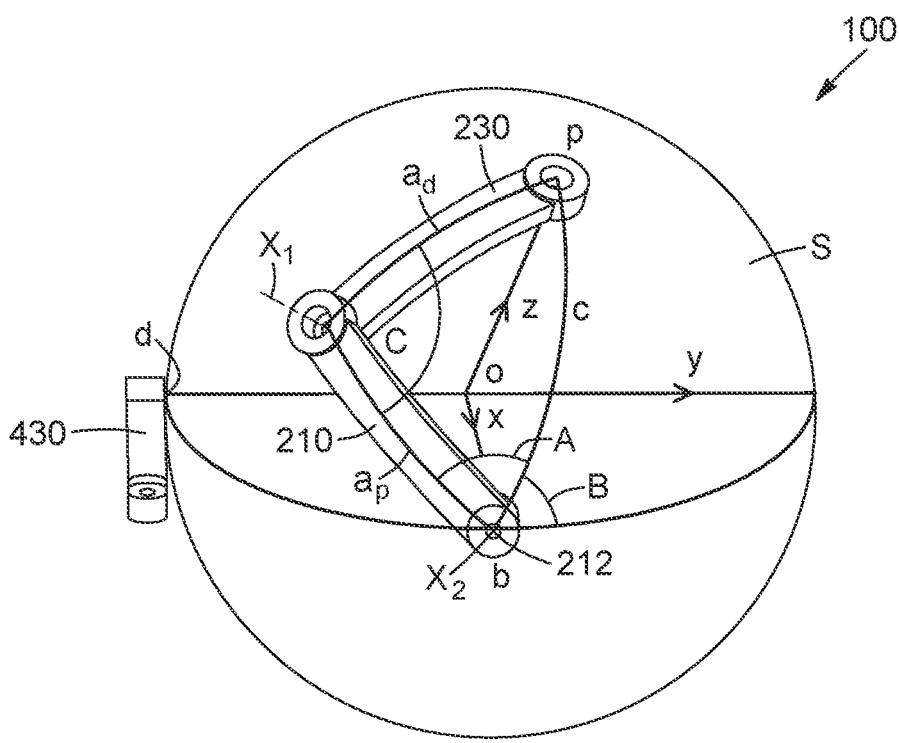

As best shown in FIG. 11, the proximal arm segment 210 has a proximal arm length a—corresponding to a length of the proximal arc ap—which is substantially equal to a distal arm length a of the distal arm segment 230. In other words, the length of the distal arm segment 230 corresponds substantially to the length of the distal arc ad.

The proximal arm length could be measured between the base-mounting end portion 212 (and more particularly the section of the base-mounting end portion 212 connectable—either directly or indirectly—to the support structure) and the distal segment-mounting end portion 214 (for instance the section thereof intersecting the arm segment connection axis X1, in the embodiment shown).

In the embodiment shown, the base-mounting end portion 212 of the proximal arm segment 210 is pivotally connectable—either directly or indirectly—to the support structure about a base-mounting rotation axis X2. In the embodiment shown, the base-mounting rotation axis X2 intersects the center o of the arm displacement sphere S. In other words, the base-mounting rotation axis X2 is locally substantially perpendicular to a surface of the arm displacement sphere S (i.e., at a section of the displacement sphere surface facing the base-mounting end portion 212).

In the embodiment shown, the proximal arm length could thus be measured between the section of the base-mounting end portion 212 intersecting the base-mounting rotation axis X2 and the section of the distal segment-mounting end portion 214 intersecting the arm segment connection axis X1.

As best described below, the distal arm length could be measured between the proximal segment-mounting end portion 232 (for instance the section thereof intersecting the arm segment connection axis X1, in the embodiment shown) and the tool-holding end portion 234.

In the embodiment shown, the arc segment connection axis X1 intersects the center o of the arm displacement sphere S. In other words, the arc segment connection axis X1 is locally substantially perpendicular to the surface of the arm displacement sphere S (i.e., at a section of the displacement sphere surface facing the proximal segment-mounting end portion 232).

Figure 10:
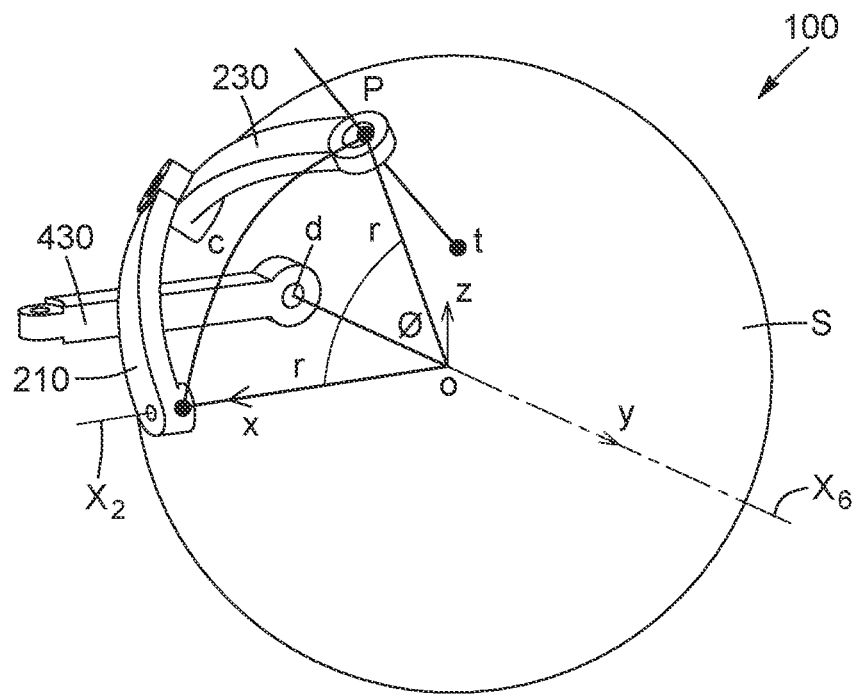
FIGS. 10 and 11 are respectively front perspective and top perspective views of the articulated positioning system of FIG. 4, only a proximal base segment of the arm-supporting base and the robotized arm assembly thereof being represented.

The arm displacement sphere S has a radius r (FIG. 10). In the embodiment shown, the radius r is greater than about 10 cm. In another embodiment, the radius r is greater than about 15 cm. In another embodiment, the radius r is greater than about 20 cm. In yet another embodiment, the radius r is greater than about 25 cm.

In the embodiment shown, the proximal arm segment 210 can be pivoted about the base-mounting rotation axis X2 of a proximal arm-pivoting angle comprised between about 0 degree and about 90 degrees. In another embodiment, the proximal arm-pivoting angle is comprised between about 0 degree and about 120 degrees. In another embodiment, the proximal arm-pivoting angle is comprised between about 0 degree and about 180 degrees. In yet another embodiment, a maximum value of the proximal arm-pivoting angle is greater than about 180 degrees.

In the embodiment shown, the distal arm segment 230 can be pivoted with respect to the proximal arm segment 210 about the arm segment connection axis X1 of a distal arm-pivoting angle comprised between about 0 degree and about 120 degrees. In another embodiment, the distal arm-pivoting angle is comprised between about 0 degree and about 180 degrees. In another embodiment, the distal arm-pivoting angle is comprised between about 0 degree and about 300 degrees. In yet another embodiment, the distal arm-pivoting angle is comprised between about 0 degree and about 360 degrees.

As best described below with reference to FIGS. 10 and 11, the robotized arm assembly 200 is thus configured for the tool-holding end portion 234 thereof to reach substantially any point on a half of the arm displacement sphere S by modifying at least one of the proximal arm-pivoting angle and the distal arm-pivoting angle.

It is appreciated that the shape and the configuration of the robotized arm assembly 200, 1200, as well as the shape, the configuration and the relative location of the proximal arm segment and the distal arm segment thereof can vary from the embodiments shown.

Figure 6:
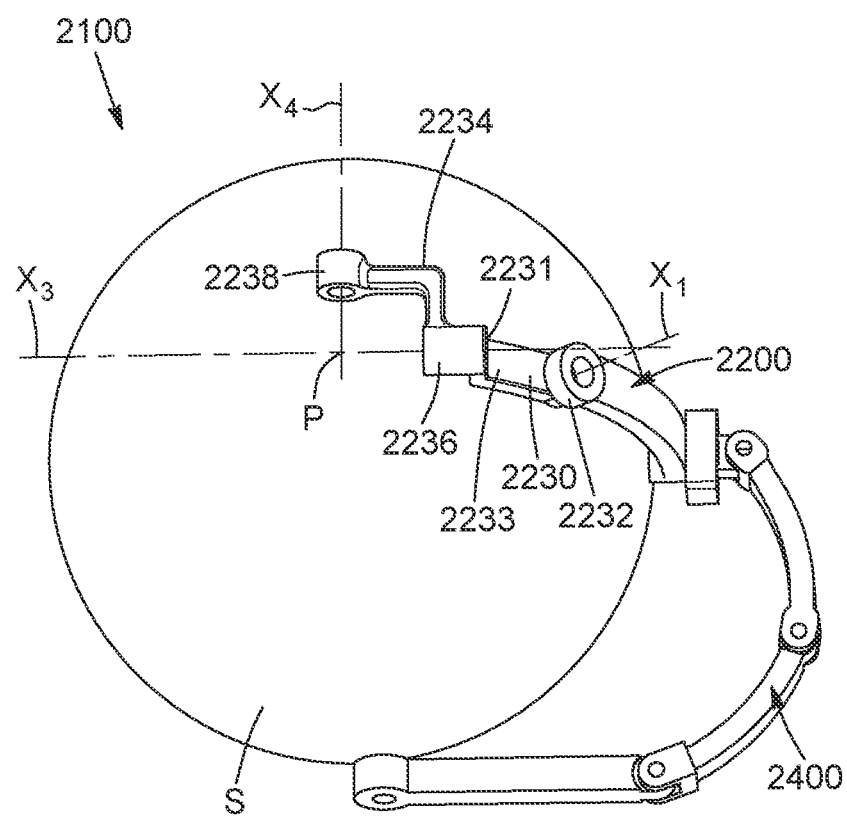
FIG. 6 is a top perspective view of an articulated positioning system in accordance with a third embodiment, the tool-holding assembly thereof being removed.

As represented in FIG. 6, it could be conceived a robotized arm assembly 2200 of an articulated positioning system 2100 with a distal arm segment 2230 having a tool-holding end portion 2234 substantially L-shaped.

Figure 7:
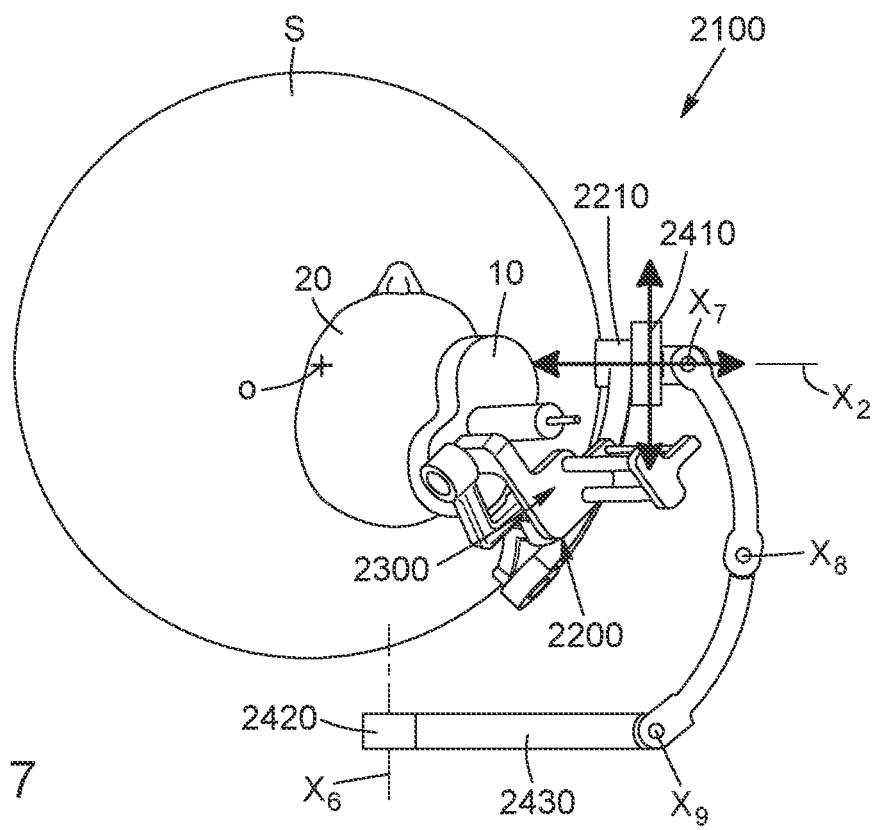
FIGS. 7 and 8 are two top elevational views of the articulated positioning system of FIG. 6, with the tool-holding assembly mounted to the robotized arm assembly thereof, the arm-supporting base thereof being configured in two distinct arm-supporting configurations.
Figure 8:
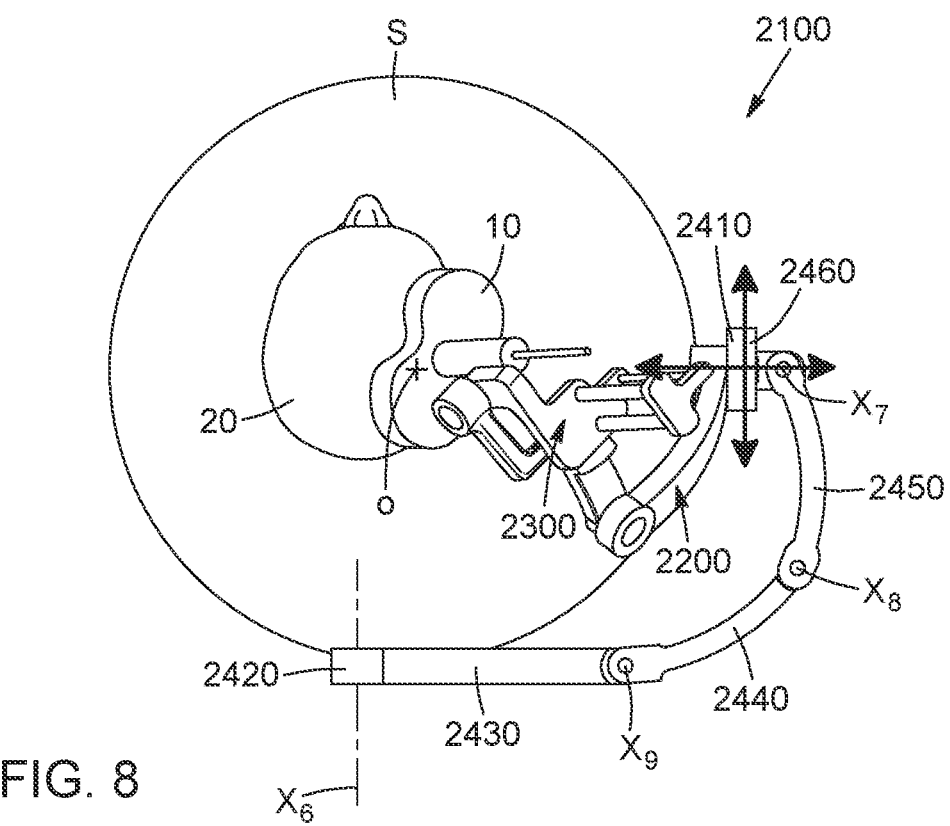

In the third embodiment shown in FIGS. 6 to 8, the tool-holding end portion 2234 comprises a proximal sleeve 2236 having a substantially cylindrical shape with an axis X3 substantially parallel to a tangential direction of the distal arm segment 2230 at a junction 2231 between a central portion 2233 of the dial arm segment 2230 and the tool-holding end portion 2234. The tool-holding end portion 2234 further comprises a distal sleeve 2238 having a substantially cylindrical shape with an axis X4 substantially perpendicular to the above-mentioned tangential direction of the distal arm segment 2230. In other words, the axes X3, X4 of the proximal and distal sleeves 2236, 2238 of the tool-holding end portion 2234 are substantially perpendicular to each other. In this third embodiment, the distal arm length of the distal arm segment 2230 could be measured between the section of the proximal segment-mounting end portion 2232 intersecting the arm segment connection axis X1 and the intersection p of the axes X3, X4 of the proximal and distal sleeves 2236, 2238 of the tool-holding end portion 2234.

It is appreciated that the shape and the configuration of the robotized arm assembly, as well as the number, shape and relative location of components thereof, can vary from the embodiments shown.

Tool-Holding Assembly

In the embodiment shown, for instance as represented in FIGS. 6 to 8, the articulated positioning system 2100 further comprises a tool-holding assembly 2300 mounted to the tool-holding end portion 2234 of the distal arm segment 2230. It is thus understood that the scientific or medical tool 10 is mounted to the tool-holding end portion of the distal arm segment via the tool-holding assembly 2300.

The tool-holding assembly 2300 comprises a tool-receiving portion 2310 and first and second tool-pivoting devices 2320, 2330.

In the embodiment shown, the first and second tool-pivoting devices 2320, 2330 are respectively at least partially mounted to the proximal and distal sleeves 2236, 2238 of the tool-holding end portion 2234. In other words, the first and second tool-pivoting devices 2320, 2330 are at least partially received in the substantially cylindrical cavities defined by the proximal and distal sleeves 2236, 2238. The tool-receiving portion 2310 is at least partially delimited by the proximal and distal sleeves 2236, 2238.

The first and second tool-pivoting devices 2320, 2330 have respectively first and second tool-pivoting axes intersecting each other and corresponding substantially to the above-mentioned axes X3, X4 of the proximal and distal sleeves 2236, 2238. The first and second tool-pivoting devices 2320, 2330 are configured to pivot the scientific or medical tool 10, when at least partially engaged with the tool-receiving portion 2310, respectively about the first and second tool-pivoting axes X3, X4. In the embodiments shown (as represented for instance in FIGS. 1A, 3A and 3B), the tool 10 comprises a holder-engaging portion 12 at least partially engageable with the tool-receiving portion 1310 of the tool-holding assembly 1300 and a head-contacting portion 14 spaced apart from the tool-receiving portion 1310 and from the first and second tool-pivoting devices 1320, 1330 when in use (i.e., when the holder-engaging portion 12 is at least partially engaged with the tool-receiving portion 1310).

In other words, as best shown in FIGS. 7 and 8, the head-contacting portion 14 of the tool 10 extends within the displacement sphere S while at least a section of the holder-engaging portion 12 extends at least partially between the proximal and distal sleeves 2236, 2238, in the vicinity or onto the surface of the arm displacement sphere S. In use, the intersection p of the first and second tool-pivoting axes X3, X4 is contained within the holder-engaging portion 12 of the tool 10.

As mentioned above, the first and second tool-pivoting axes X3, X4 of the first and second tool-pivoting devices 1320, 1330, 2320, 2330 are substantially perpendicular to each other.

In other words, the tool-holding assembly 1300, 2300 comprises a gimbal with 2 substantially perpendicular rotation axes, allowing respectively to tilt and pitch the tool 10 when engaged therewith, the substantially perpendicular rotation axes X3, X4 being centered on an end point (the above-described intersection p) of the robotized arm 1200, 2200 (i.e., an end point of the distal arm segment 1230, 2230 thereof).

In the embodiment shown, the tool 10 can be pivoted with respect to the tool-holding end portion 1234, 2234 of the distal arm segment 1230, 2230 about the first tool-pivoting axis X3 of a first tool-pivoting angle comprised between about 0 degree and about 45 degrees. In another embodiment, the first tool-pivoting angle is comprised between about 0 degree and about 60 degrees. In another embodiment, the first tool-pivoting angle is comprised between about 0 degree and about 90 degrees. In yet another embodiment, a maximum value of the first tool-pivoting angle is greater than about 90 degrees.

In the embodiment shown, the tool 10 can be pivoted with respect to the tool-holding end portion 1234, 2234 of the distal arm segment 1230, 2230 about the second tool-pivoting axis X4 of a second tool-pivoting angle comprised between about 0 degree and about 45 degrees. In another embodiment, the second tool-pivoting angle is comprised between about 0 degree and about 60 degrees. In another embodiment, the second tool-pivoting angle is comprised between about 0 degree and about 90 degrees. In yet another embodiment, a maximum value of the second tool-pivoting angle is greater than about 90 degrees.

In other words, the tool-holding assembly 1300, 2300 is configured to re-orient an angle of the tool 10 (i.e., to adjust an orientation thereof with respect to the head 20 of the subject) while maintaining a constant location of an origin p (corresponding substantially to the intersection p of the axes X3, X4) on the displacement sphere surface.

In the embodiment shown, as best shown in FIGS. 3A and 3B, the tool-holding assembly 1300 further comprises a tool-translating device 1340—or liner slider 1340—defining a tool-translating axis X5, wherein in use (i.e., when the holder-engaging portion 12 of the tool 10 is at least partially engaged with the tool-receiving portion 1310), the scientific or medical tool 10 is translatable along the tool-translating axis X5. In other words, the tool 10 is translatable towards and away from the head 20 of the subject along the tool-translating axis X5.

In the embodiment shown, the tool-translating axis X5 intersects the first and second tool-pivoting axes X3, X4 (i.e., intersects the origin p of the tool 10 onto the surface of the arm displacement sphere). In the embodiment shown, the tool-translating axis X5 is substantially perpendicular to the first and second tool-pivoting axes X3, X4.

In other words, the tool-holding assembly 1300, 2300 is configured to move the tool 10 along the re-oriented direction (i.e., once the tool 10 has been pivoted about the first and/or second tool-pivoting axes X3, X4) a pre-determined distance or until the head-contacting portion 14 of the tool 10 contacts the determined section of the scalp of the head 20.

In the embodiment shown, the tool-holding assembly 1300 comprises a third tool-pivoting device 1350 having a third tool-pivoting axis. For instance, the third tool-pivoting axis is substantially parallel to (substantially corresponds to, in the embodiment shown) the tool-translating axis X5. The third tool-pivoting axis X5 thus intersects and is substantially perpendicular to the first and second tool-pivoting axes X3, X4.

In use, the scientific or medical tool 10 is pivotable about the third tool-pivoting axis X5. In other words, the third tool-pivoting device 1350 of the tool-holding assembly 1300 forms a twist rotator 1350.

In the embodiment shown, the tool 10 can be pivoted with respect to the tool-holding end portion 1234, 2234 of the distal arm segment 1230, 2230 about the third tool-pivoting axis X5 of a third tool-pivoting angle comprised between about 0 degree and about 90 degrees. In another embodiment, the third tool-pivoting angle is comprised between about 0 degree and about 180 degrees. In another embodiment, the third tool-pivoting angle is comprised between 0 degree and about 270 degrees. In yet another embodiment, the third tool-pivoting angle is comprised between about 0 degree and about 360 degrees.

Referring to FIGS. 3A and 3B, the tool-holding assembly 1300 might comprise a suspension device 1360 operatively coupled to the tool-translating device 1340. For instance, the suspension device 1360 comprises a spring or any other suitable biasing member extending around at least an end portion of the holder-engaging portion 12 or operatively coupled thereto and sandwiched between the head-contacting portion 14 of the tool 10 and an upper portion of the tool-holding assembly 1300 when in use.

The tool-holding assembly 1300 is thus configured so that any location of the head 20 of the subject can be reached with substantial flexibility while achieving an optimal trajectory to reach said predetermined location. In other words, the suspension device 1360 allows decoupling the tool 10 from the robotized arm assembly 1200 to ensure a substantially soft touch on the head scalp and small movements of the head without requiring movements of the robotized arm assembly 1200 and/or the tool-holding assembly 1300. The pressure of the tool 10 (i.e., of the head-contacting portion 14 thereof) on the subject head 20 or head scalp can be calculated, for instance and without being limitative, by monitoring a deflection distance of the spring and knowing a value of a spring constant. A preset force can thus be achieved by maintaining a substantially constant deflection of the spring.

It is appreciated that the shape and the configuration of the tool-holding assembly 1300, 2300, as well as the shape, the configuration, the number and the relative arrangement of the different components thereof, can vary from the embodiment shown.

It is further appreciated that the tool-receiving portion 1310, 2310 of the tool-holding assembly 1300, 2300 is shaped and dimensioned to receive different types of medical and/or scientific tools, for instance different types of TMS coils from different manufacturers and/or different types of focused ultrasound devices.

It is also understood that the articulated positioning system 100, 1100, 2100 in particular due to the shape and arrangement of the different components of the robotized arm assembly 200, 1200, 2200 and the tool-holding assembly 1300, 2300 allows tilting, rolling and/or twisting the tool 10 as well as approaching the tool 10 until a contact is made with the head scalp.

Arm-Supporting Base (or Articulated Arm-Supporting Base or Articulated Arm-Supporting Assembly)

In the embodiment shown, as represented for instance in FIGS. 7 and 8, the articulated positioning system 2100 comprises an arm-supporting base 2400 (or arm-supporting assembly 2400 or articulated arm-supporting base 2400) comprising an arm-mounting portion 2410 mounted to the base-mounting end portion 2212 of the proximal arm segment 1210, and a support-mounting portion 2420 mountable to the support structure. In other words, in the embodiment shown, the robotized arm assembly 2200 is thus connected to the support structure via the arm-supporting base 2400. It could also be conceived an articulated positioning system wherein the robotized arm assembly would be directly (for instance in a pivotable manner) mounted to the support structure.

The base-mounting rotation axis X2 about which the proximal arm segment 2210 is pivotally mounted thus forms a connection axis between the robotized arm assembly 2200 and the arm-supporting base 2400.

In the embodiment shown, the support-mounting portion 2420 of the arm-supporting base 2400 is pivotally mountable to the support structure about a support-mounting rotation axis X6.

In the embodiment shown, the support-mounting rotation axis X6 is substantially perpendicular to the base-mounting rotation axis X2. Depending on the relative position of the different components of the arm-supporting base 2400, the support-mounting rotation axis X6 could intersect the center o of the arm displacement sphere S.

In the embodiment shown, the arm-supporting base 2400 comprises a plurality of articulated base segments 2430, 2440, 2450, 2460 (four, in the embodiment shown) arranged between the arm-mounting portion 2410 and the support-mounting portion 2420.

In the embodiment shown, at least two of the plurality of articulated base segments 2430, 2440, 2450, 2460 (the four of them, in the embodiment shown) are pivotally mounted to each other about corresponding base segment connection axes X7, X8, X9. For instance, the base segment connection axes X7, X8, X9 are substantially parallel to each other. For instance, the base segment connection axes X7, X8, X9 are transversal (for instance substantially perpendicular) to the support-mounting rotation axis X6. For instance, the base segment connection axes X7, X8, X9 are transversal (for instance substantially perpendicular) to the base-mounting rotation axis X2.

In the embodiment shown, the base segments 2430, 2440, 2450, 2460 comprise a distal base segment 2460 comprising the arm-mounting portion 2410, a proximal base segment 2430 comprising the support-mounting portion 2420 and at least one (two in the embodiment shown) intermediate base segment 2440, 2450 extending between the distal base segment 2460 and the proximal base segment 2430.

As best shown in FIGS. 7 and 8 which represent two top elevational views of the articulated positioning system 2100 wherein the arm-supporting base 2400 is configured in two distinct arm-supporting configurations, the arm-supporting base 2400 is configured to enable movement thereof next to the subject's head 20 (i.e., in forward and/or backward and/or left and/or right directions and/or to rotate the robotized arm assembly 2200 over the head 20). Thus, the arm-supporting base 2400 allows the center o of the arm displacement sphere S to be moved and optimized for a pre-determined target (or set of targets) and/or a pre-determined head location and further allows the robotized arm assembly 2200 (in particular the tool-holding end portion 2234 thereof) to reach areas that would be in a blind spot in another arm-supporting configuration. The arm-supporting base 2400 is also configured to allow pivoting about the support-mounting rotation axis X6, for instance in a rear portion of a subject chair to allow the robotized arm assembly 2200 to rotate, for instance, from left to right hemispheres and vice-versa.

It is appreciated that the shape and the configuration of the arm-supporting base, as well as the shape, the number, the configuration and the relative arrangement of the different components thereof, can vary from the embodiment shown.

Referring to FIGS. 1A to 2B, there is shown another possible embodiment of the arm-supporting base 1400 (or arm-supporting assembly 1400 or articulated arm-supporting base 1400) of the articulated positioning system 1100.

In the embodiment shown, the arm-supporting assembly 1400 comprises an arm-mounting portion 1410 mounted to the base-mounting end portion 1212 of the proximal arm segment 1210, and a support-mounting portion 1420 mountable to the support structure 50. In other words, in the embodiment shown, the robotized arm assembly 1200 is connected to the support structure 50 via the arm-supporting assembly 1400.

The base-mounting rotation axis X2 about which the proximal arm segment 1210 is pivotally mounted thus forms a connection axis between the robotized arm assembly 1200 and the arm-supporting assembly 1400.

In the embodiment shown, the support-mounting portion 1420 of the arm-supporting assembly 1400 is pivotally mountable to the support structure 50 about a support-mounting rotation axis X6. In the embodiment shown, the support-mounting rotation axis X6 is substantially perpendicular to the base-mounting rotation axis X2. In the embodiment shown, at least one of the support-mounting rotation axis X6 and the base-mounting rotation axis X2 is substantially horizontal. Depending on the relative position of the different components of the arm-supporting assembly 1400, the support-mounting rotation axis X6 could intersect the center of the arm displacement sphere.

In the embodiment shown, the arm-supporting assembly 1400 comprises a plurality of arm-supporting members 1430, 1440 (two, in the embodiment shown) arranged between the arm-mounting portion 1410 and the support-mounting portion 1420. For instance, the support-mounting portion 1420 comprises first and second substantially parallel support-mounting plates 1421, 1423, spaced apart from each other, a longitudinal end portion 1431 of the proximal arm-supporting member 1430 extending between the support-mounting plates 1421, 1423.

In the embodiment shown, the proximal and distal arm-supporting members 1430, 1440 extend along substantially perpendicular longitudinal directions L1, L2. For instance, the longitudinal direction L2 of the distal arm-supporting member 1440 is substantially parallel to the support-mounting rotation axis X6. For instance, the longitudinal direction L1 of the proximal arm-supporting member 1430 is substantially perpendicular to the support-mounting rotation axis X6. For instance, the longitudinal directions L1, L2 and the support-mounting rotation axis X6 are in a same plane (for instance substantially horizontal).

Figure 2A:
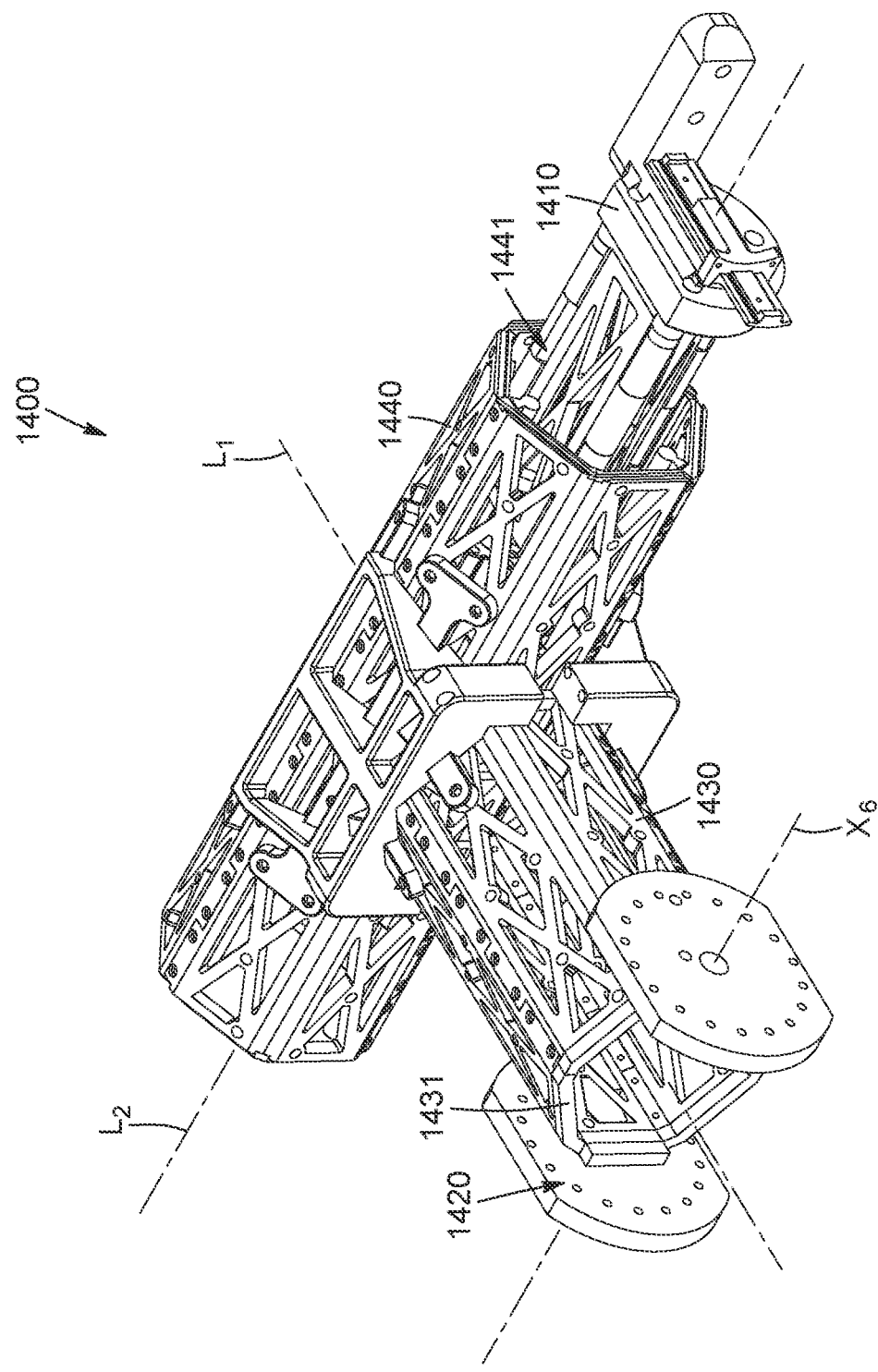
FIG. 2A is a front perspective view of the arm-supporting assembly of the articulated positioning system of FIG. 1A, in a first configuration.
Figure 2B:
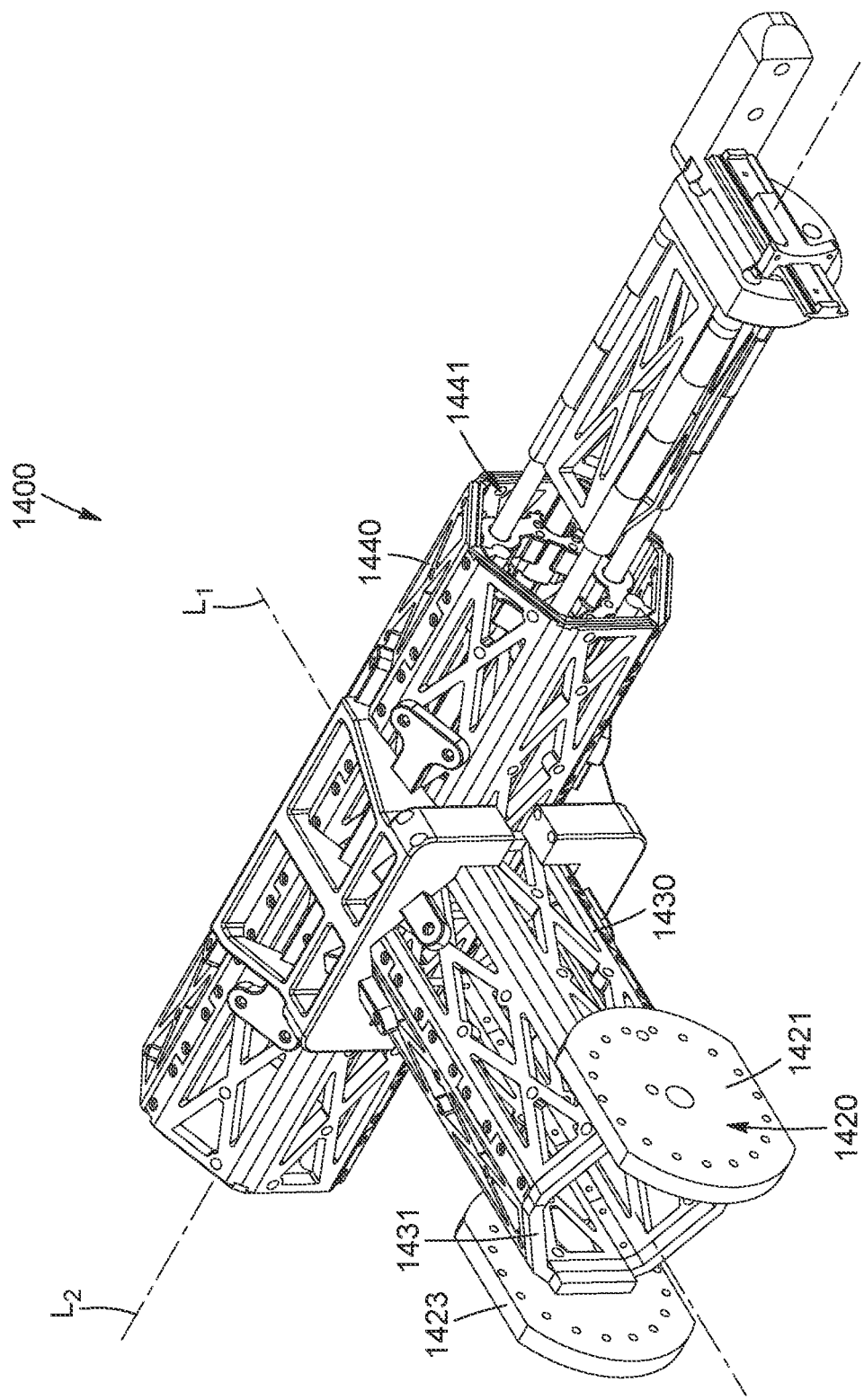
FIG. 2B is a front perspective view of the arm-supporting assembly of the articulated positioning system of FIG. 1A, in a second configuration wherein a distal base member of the arm-supporting assembly is partially deployed.

In the embodiment shown, the distal arm-supporting member 1440 comprises a telescopic assembly 1441 to translate the arm-mounting portion 1410 along the longitudinal direction L2 of the distal arm-supporting member 1440, as best shown in FIGS. 2A and 2B. It could also be conceived a proximal arm-supporting member 1430 that would be shaped and dimensioned (for instance which would comprise a telescopic assembly) in order to translate the distal arm-supporting member 1440 along the longitudinal direction L1 of the proximal arm-supporting member 1430.

Figure 1B:
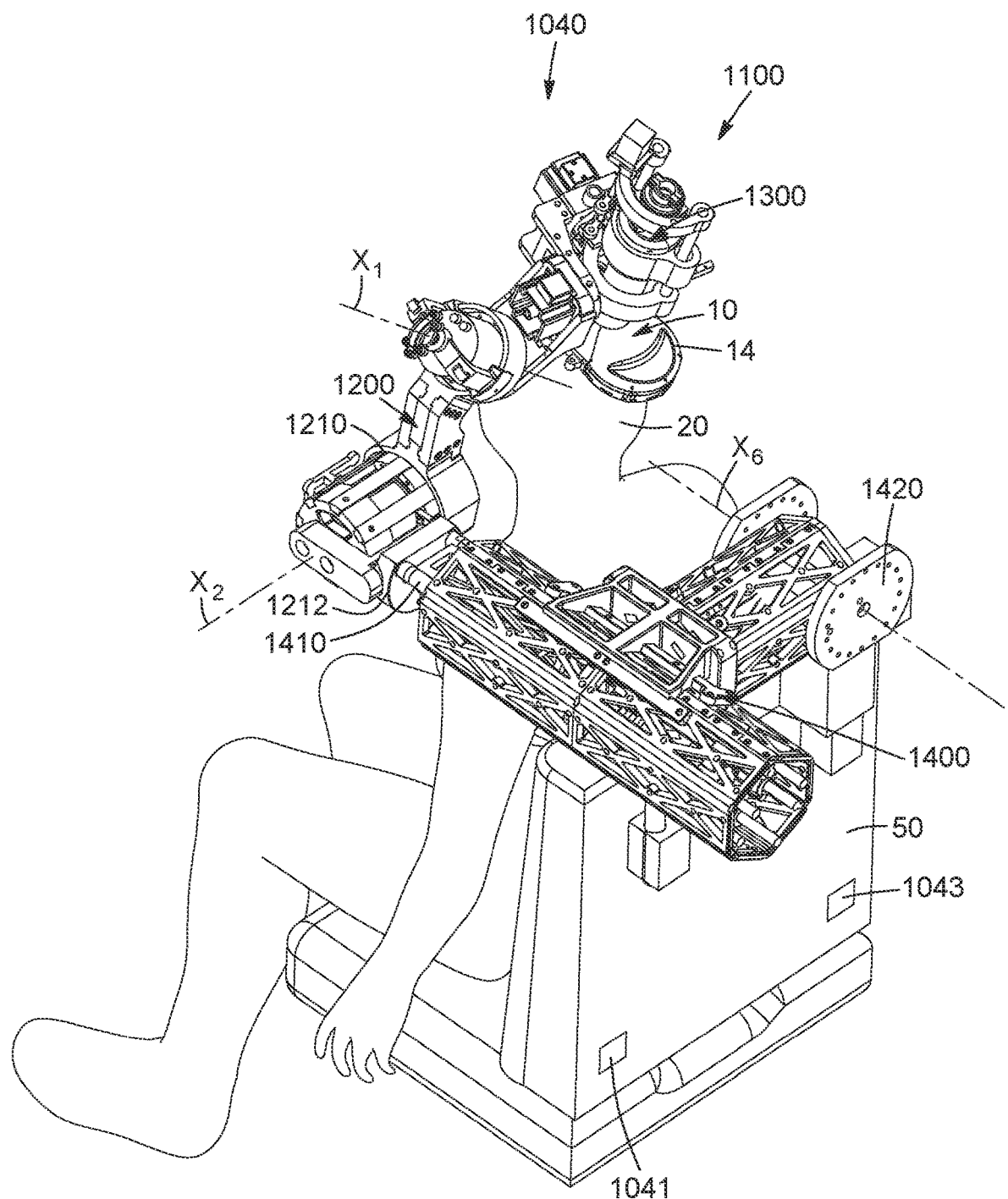
FIG. 1B is a rear perspective view of the robotized positioning assembly of FIG. 1A.

In the embodiment shown, the distal arm-supporting member 1440 comprises the arm-mounting portion 1410 and the proximal arm-supporting member 1430 comprises the support-mounting portion 1420. It is thus understood that the arm-supporting assembly 1400 is configured to enable movement thereof next to the subject's head 20 (i.e., at least in forward and/or backward and/or to rotate the robotized arm assembly 1200 over or below the head 20). Thus, the arm-supporting assembly 1400 allows the center of the arm displacement sphere to be moved and optimized for a pre-determined target (or set of targets) and/or a pre-determined head location and further allows the robotized arm assembly 1200 (in particular the tool-holding end portion 1234 thereof) to reach areas that would be in a blind spot in another arm-supporting configuration. The arm-supporting assembly 1400 is also configured to allow pivoting about the support-mounting rotation axis X6, for instance in a rear portion of a subject chair to allow the robotized arm assembly 1200 to rotate, for instance, from left to right hemispheres and vice-versa. As best shown in FIGS. 1A and 1B, the arm-supporting assembly 1400 could also be slidably mounted to the support structure 50, for instance along a substantially vertical direction. In other words, the arm-supporting assembly 1400 could be lowered or raised with respect to the chair 30, so as to adjust a position of the robotized arm assembly 1200 over or below the head).

As detailed above, the articulated positioning system 100, 1100, 2100 of the present disclosure is configured to provide the tool 10 when in use a plurality of degrees of freedom (i.e., when mounted to the tool-holding end portion 1234, 2234 of the robotized arm assembly 1200, 2200). In the embodiment shown, the different degrees of freedom comprise, from the support structured towards the head-contacting portion 14 of the tool 10, the support-mounting rotation axis X6, the different base segment connection axes X7, X8, X9 if any, the base-mounting rotation axis X2, the arm segment connection axis X1, the first, second and third tool-pivoting axes X3, X4, X5 and the tool-translating axis X5.

Figure 9:
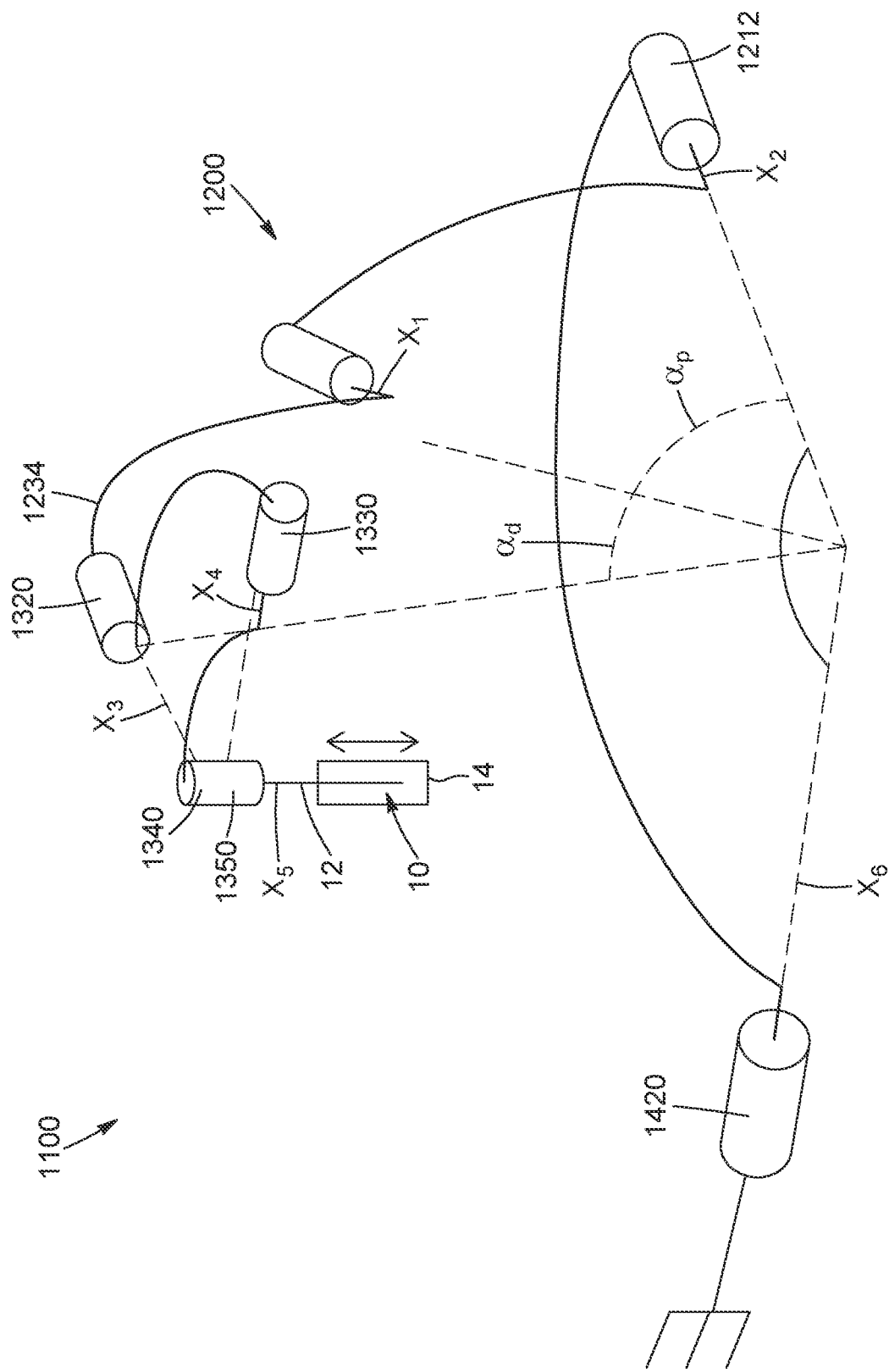
FIG. 9 is a kinematic diagram of the articulated positioning system of FIG. 1, representing seven degrees of freedom of the tool.

Some of these degrees of freedom are represented in the kinematic diagram of the articulated positioning system 1100 of FIG. 9.

It is It is appreciated that the number, the position and the relative arrangement of the different degrees of freedom can vary from the embodiments shown.

Robotized Positioning Assembly

As best shown in FIGS. 1A and 1B, according to another aspect of the disclosure, there is provided a robotized positioning assembly 1040, comprising an articulated positioning system 1100 according to the present disclosure, a head position-determining system to determine a head position of the subject, a calculation device 1041 to determine the position of at least the proximal and distal arm segments 1210, 1230 of the robotized arm assembly 1200 as a function of the determined head position, and a controller 1043 operatively coupled to the articulated positioning system 1100 to displace components thereof with respect to the above-described degrees of freedom as a function of the determined positions of at least the proximal and distal arm segments 1210, 1230. In other words, the controller 1043 is configured to pivot at least one of the proximal and distal arm segments 1210, 1230 as a function of the determined— or targeted—positions thereof.

In the embodiment shown, the robotized positioning assembly 1040 further comprises the subject chair 30. The subject chair 30 enables the subject to sit comfortably in a variety of positions from upright to supine. The subject head 20 will be supported in a way as to minimize unintended head movement while maximizing access to the head for the TMS coil 10 (or other scientific or medical tool 10). The subject chair 30 should accommodate the subject's head 20 being supported in a head rest from the rear or from the front to enable access to the occipital and cerebellar regions.

The articulated positioning system 1100 is configured to equip subject chairs of different types and/or dimensions.

It is understood that the articulated positioning system 1100 comprises a plurality of motors and actuators operatively coupled to the controller and configured to displace the corresponding components of the articulated positioning system 1100 with respect to the above-described degrees of freedom upon reception of instructions sent by the controller.

The articulated positioning system 1100 might further comprise one or more encoders wherein a position of the encoders is readable by the controller.

In the embodiment shown, the controller can comprise a control software (e.g. a neuro-navigation software) which would use anatomical images (e.g. MRI) to plan a stimulation site, and to co-register anatomical images with the subject.

It is understood that the controller communicates with the articulated positioning system 1100 to move the tool 10 to a given position and/or to orient the tool in a pre-determined orientation, via actuation of any of the different above-described components of the articulated positioning system 1100. The robotized positioning assembly 1040 is thus configured to guide in real-time the tool 10 mounted to the articulated positioning system 1100.

The articulated positioning system 1100, via the above-described degrees of freedom, upon reception of instructions sent by the controller, places the tool 10 over the pre-determined subject head section and/or in the pre-determined orientation thereof and, in real-time, maintains said location and/or orientation with respect to the head 20 by compensating for head movement for the duration of a session.

The robotized positioning assembly 1040 is further configured to place the tool 10 over a series of targets in sequence (as controlled by the controller) and to orient the tool 10 to reach any target that the tool 10 is capable of reaching and that the user may want to manipulate. In other words, the robotized positioning assembly 1040 is configured to move the tool from one location to another (of the order of a few cm or mm) while maintaining a predefined, constant, gentle pressure with the scalp of the subject.

The robotized positioning assembly might further comprise a user interface (not represented).

It is appreciated that the shape and the configuration of the robotized positioning assembly 1040 and of its different components can vary from the embodiment shown.

Method for Positioning a Scientific or Medical Tool in a Predetermined Position with Respect to a Head of a Subject According to yet another aspect of the disclosure, there is provided a method for positioning a scientific or medical tool 10 in at least one of a predetermined position and a predetermined orientation with respect to a head 20 of a subject. The method according to embodiments of the present disclosure may be carried out with an articulated positioning system 100, 1100, 2100 such as those described above.

Figure 12:
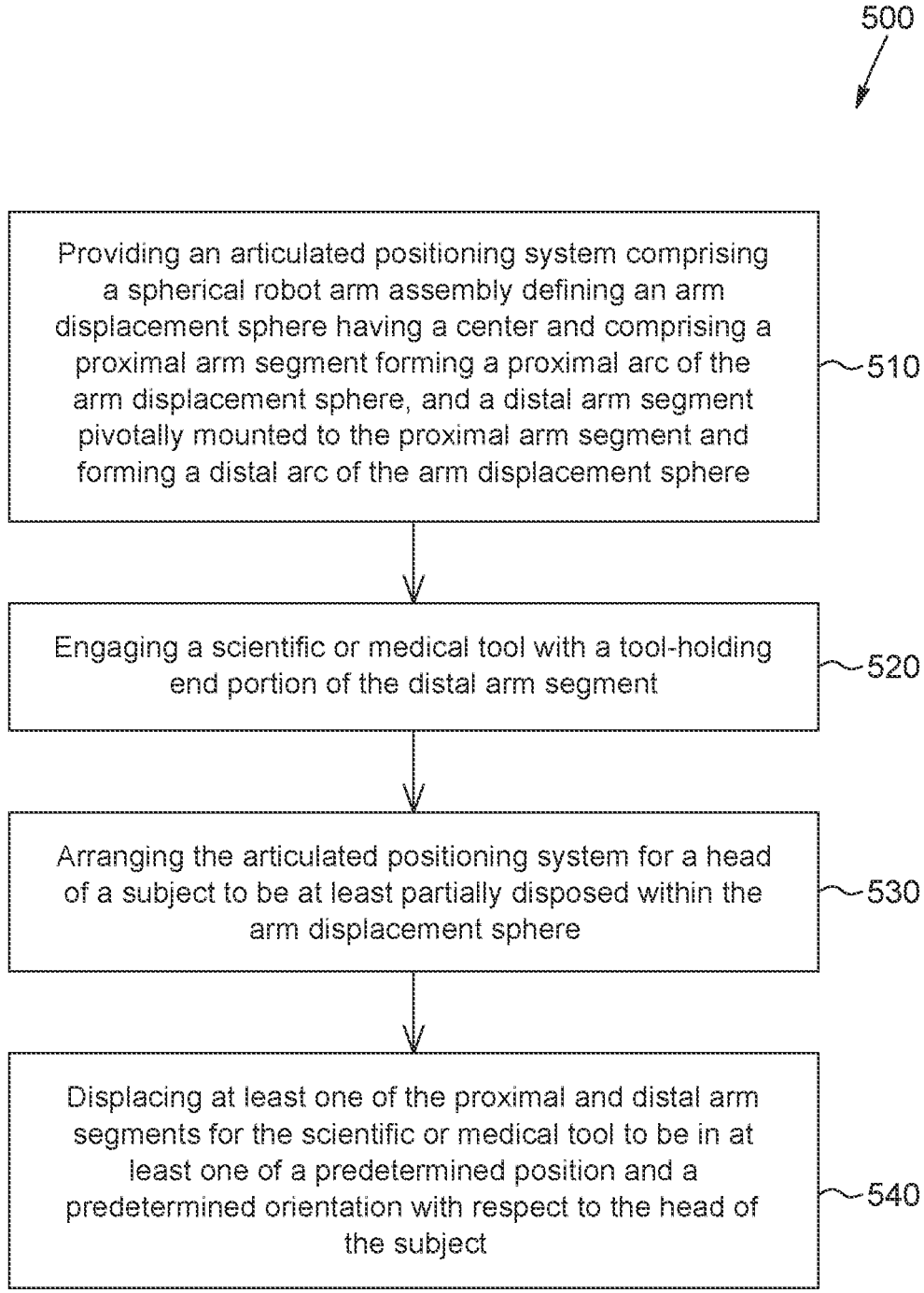
FIG. 12 is a block diagram representing the different steps of a corresponding method for positioning the scientific or medical tool in at least one of a predetermined position and a predetermined orientation with respect to the head of the subject.

Referring to FIG. 12, the method 500 comprises a step 510 of providing an articulated positioning system connectable to a support structure and comprising a spherical robot arm assembly defining an arm displacement sphere having a center, the spherical robot arm assembly comprising: a proximal arm segment comprising a base-mounting end portion connectable to the support structure and an opposed distal segment-mounting end portion, the proximal arm segment forming a proximal arc of the arm displacement sphere; and a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere; a step 520 of engaging said scientific or medical tool with said tool-holding end portion; a step 530 of arranging the articulated positioning system for the head of the subject to be at least partially disposed within the arm displacement sphere; and a step 540 of displacing at least one of the proximal and distal arm segments for said scientific or medical tool to be in said at least one of a predetermined position and a predetermined orientation.

In the embodiment shown, the method 500 might comprise determining a projected location p of a predetermined head position t (or target t—FIGS. 10 and 11) of the head 20 of the subject on the arm displacement sphere S; and displacing at least one of the proximal and distal arm segments for the tool-holding end portion to be placed at or in the vicinity of the projected location p.

Calculation Example

FIGS. 10 and 11 illustrate a non-limitative possibility to determine the position of the proximal and distal arm segments 210, 230 of the robotized arm assembly 200 of the articulated positioning system 100 as a function of the predetermined head position t (or target t). t is for instance a location on the scalp of the subject head 20 and is arranged within the arm displacement sphere S.

The robot coordinate system could be defined as the origin o of the arm displacement sphere S of radius r, with x, y, z axes defined as shown in FIG. 11. The axes of the coordinate system of the arm displacement sphere S are defined so that the plane defined by axes x and y corresponds to a plane where the points o (the arm displacement sphere origin), b (the intersection between the base-mounting rotation axis X2 and the proximal arm segment 210) and d (the intersection between the supporting-mounting rotation axis X6 and the proximal base segment 430 of the arm-supporting base 400) lie. In other words, in the embodiment shown, the axes x and y correspond respectively to the base-mounting rotation axis X2 and the support-mounting rotation axis X6.

In the embodiment shown, the desired orientation of the tool 10 is expressed as a transform matrix $_{coil}^{robot}T$ defining the tilt, pitch and twist of the head-contacting portion 14 of the tool 10 in the robot reference coordinate system. v is considered as the vector of approach of the tool 10 to the target t and is defined as the z-component of the rotation matrix.

As mentioned above, a is the length of both the distal arc ad and the proximal arc ap.

p is the projection location of the target t onto the surface of the arm displacement sphere S. In other words, p is the intersection of vector v with the surface of the arm displacement sphere S. The angle B is defined between the y axis and the projection of the vector $\vec{bp}$ on the plane defined by the axes x and y.

We further measure the angle ø between vectors $\vec{ob}$ and $\vec{op}$. The arc length c between points p and b is therefore equal to rø.

It is thus possible to determine the value of angles C and A, wherein:
C is the angle delimited by the proximal arm segment 210 and the distal arm segment 230 (i.e., the distal arm-pivoting angle which can be modified upon rotation of at least one of the proximal arm segment 210 and the distal arm segment 230 about the arm segment connection axis X1), and
A is an angle corresponding to an angular position of the proximal arm segment 210 with respect to the base-mounting rotation axis X2.

The angle C can be determined by:

$$C = \cos^{-1}\left(\frac{\cos(c) - \cos(a)^2}{\sin(a)^2}\right).$$

The angle A can be determined by:

$$A = \cos^{-1}\left(\frac{\cos(a) - \cos(a)\cos(c)}{\sin(a)\sin(c)}\right).$$

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. An articulated positioning system for positioning a scientific or medical tool in at least one of a predetermined position and a predetermined orientation with respect to a head of a subject, the articulated positioning system being connectable to a support structure and comprising:
a spherical robot arm assembly defining an arm displacement sphere having a center, the spherical robot arm assembly comprising:
a proximal arm segment comprising a base-mounting end portion connectable to the support structure and an opposed distal segment-mounting end portion, the proximal arm segment forming a proximal arc of the arm displacement sphere; and
a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere;
wherein the articulated positioning system further comprises a tool-holding assembly mounted to the tool-holding end portion of the distal arm segment, the tool-holding assembly comprising a tool-receiving portion and at least first and second tool-pivoting devices having respectively first and second tool-pivoting axes intersecting perpendicularly to each other, wherein when the scientific or medical tool is engaged with the tool-receiving portion, the scientific or medical tool is pivotable about the first and second tool-pivoting axes.

2. The articulated positioning system according to claim 1, wherein the tool-holding assembly further comprises a tool-translating device defining a tool-translating axis intersecting the first and second tool-pivoting axes, wherein in use, the scientific or medical tool is translatable along the tool-translating axis.

3. The articulated positioning system according to claim 1, wherein the tool-holding assembly comprises a third tool-pivoting device having a third tool-pivoting axis intersecting the first and second tool-pivoting axes, wherein in use, the scientific or medical tool is pivotable about the third tool-pivoting axis.

4. The articulated positioning system according to claim 2, wherein the tool-holding assembly further comprises a suspension device operatively coupled to the tool-translating device.

5. The articulated positioning system according to claim 1, wherein the base-mounting end portion of the proximal arm segment is pivotally connectable to the support structure about a base-mounting rotation axis intersecting the center of the arm displacement sphere.

6. The articulated positioning system according to claim 5, wherein the articulated positioning system comprises an arm-supporting assembly comprising an arm-mounting portion mounted to the base-mounting end portion of the proximal arm segment, and a support-mounting portion mountable to the support structure, wherein the support-mounting portion is pivotally mountable to the support structure about a support-mounting rotation axis perpendicular to the base-mounting rotation axis.

7. The articulated positioning system according to claim 6, wherein the arm-supporting assembly comprises a plurality of arm-supporting members arranged between the arm-mounting portion and the support-mounting portion, wherein said plurality of arm-supporting members comprises a distal arm-supporting member comprising the arm-mounting portion and a proximal arm-supporting member comprising the support-mounting portion, wherein the proximal and distal arm-supporting members extend along perpendicular longitudinal directions, at least one of said plurality of arm-supporting members comprising a telescopic assembly.

8. The articulated positioning system according to claim 7, wherein the distal arm-supporting member comprises a distal telescopic assembly to translate the arm-mounting portion along the longitudinal direction of the distal arm-supporting member.

9. A robotized positioning assembly for positioning a scientific or medical tool in at least one of a predetermined position and a predetermined orientation with respect to a head of a subject, the robotized positioning assembly being connectable to a support structure and comprising an articulated positioning system comprising:

a spherical robot arm assembly defining an arm displacement sphere having a center, the spherical robot arm assembly comprising:
a proximal arm segment comprising a base-mounting end portion connectable to the support structure and an opposed distal segment-mounting end portion, the proximal arm segment forming a proximal arc of the arm displacement sphere; and a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere;

a head position-determining system to determine a head position of the subject;

a calculation device to determine target positions of the proximal and distal arm segments as a function of the head position and the at least one of a predetermined position and a predetermined orientation; and a controller operatively coupled to the articulated positioning system to position said proximal and distal arm segments in said determined target positions thereof wherein, when the scientific or medical tool is mounted to the tool-holding end portion of the distal arm segment, said scientific or medical tool is in said at least one of a predetermined position and a predetermined orientation with respect to the head of the subject.

10. The robotized positioning assembly according to claim 9, wherein:

the articulated positioning system further comprises a tool-holding assembly mounted to the tool-holding end portion of the distal arm segment, the tool-holding assembly comprising a tool-receiving portion and at least one tool-pivoting device having at least one tool-pivoting axis, wherein the calculation device is configured to determine at least one target tool-pivoting angle as a function of the head position and the at least one of a predetermined position and a predetermined orientation; and wherein the controller is operatively coupled to the tool-holding assembly to actuate said at least one tool-pivoting device as a function of said at least one determined target tool-pivoting angle.

11. The robotized positioning assembly according to claim 10, wherein the tool-holding assembly comprises first and second tool-pivoting devices having respectively first and second tool-pivoting axes intersecting perpendicularly each other, wherein the calculation device is configured to determine first and second target tool-pivoting angles as a function of the head position and the at least one of a predetermined position and a predetermined orientation.

12. The robotized positioning assembly according to claim 11, wherein:

the tool-holding assembly further comprises a tool-translating device defining a tool-translating axis, wherein the calculation device is configured to determine a target tool-translating position as a function of the head position and the at least one of a predetermined position and a predetermined orientation; and wherein the controller is operatively coupled to the tool-holding assembly to actuate said tool-translating device as a function of said at least one determined target tool-translating position angle.

13. The robotized positioning assembly according to claim 12, wherein the tool-holding assembly comprises a third tool-pivoting device having a third tool-pivoting axis intersecting the first and second tool-pivoting axes, wherein the calculation device is configured to determine a third target tool-pivoting angle as a function of the head position and the at least one of a predetermined position and a predetermined orientation.

14. The robotized positioning assembly according to claim 9, wherein:

the base-mounting end portion of the proximal arm segment is pivotally connectable to the support structure about a base-mounting rotation axis;
wherein the calculation device is configured to determine a target base-mounting rotation angle as a function of the head position and the at least one of a predetermined position and a predetermined orientation; and
wherein the controller is operatively coupled to the articulated positioning system to pivot the base-mounting end portion of said proximal arm segment as a function of the determined target base-mounting rotation angle.

15. The robotized positioning assembly according to claim 14, wherein the articulated positioning system comprises an arm-supporting assembly comprising an arm-mounting portion mounted to the base-mounting end portion of the proximal arm segment, and a support-mounting portion mountable to the support structure, wherein:
the support-mounting portion is pivotally mountable to the support structure about a support-mounting rotation axis;
wherein the calculation device is configured to determine a target support-mounting rotation angle as a function of the head position and the at least one of a predetermined position and a predetermined orientation; and
wherein the controller is operatively coupled to the arm-supporting assembly to pivot said support-mounting portion as a function of the determined target support-mounting rotation angle.

16. The robotized positioning assembly according to claim 15, wherein the arm-supporting assembly comprises a plurality of articulated base segments arranged between the arm-mounting portion and the support-mounting portion, wherein:
at least two of said plurality of articulated base segments are pivotally mounted to each other about corresponding base segment connection axes;
wherein the calculation device is configured to determine corresponding target base segment connection angles as a function of the head position and the at least one of a predetermined position and a predetermined orientation; and
wherein the controller is operatively coupled to the arm-supporting assembly to pivot said at least two of said plurality of articulated base segments as a function of said determined corresponding target base segment connection angles.

17. The robotized positioning assembly according to claim 9, wherein the robotized positioning assembly is for positioning a transcranial magnetic stimulation probe at or around the head of the subject.

18. A method for positioning a scientific or medical tool in at least one of a predetermined position and a predetermined orientation with respect to a head of a subject, the method comprising:
providing an articulated positioning system connectable to a support structure and comprising a spherical robot arm assembly defining an arm displacement sphere having a center, the spherical robot arm assembly comprising:
a proximal arm segment comprising a base-mounting end portion connectable to the support structure and an opposed distal segment-mounting end portion, the proximal arm segment forming a proximal arc of the arm displacement sphere; and
a distal arm segment comprising a proximal segment-mounting end portion pivotally mounted to the distal segment-mounting end portion of the proximal arm segment about an arm segment connection axis and an opposed tool-holding end portion, the distal arm segment forming a distal arc of the arm displacement sphere;
arranging the articulated positioning system for the head of the subject to be at least partially disposed within the arm displacement sphere; and
displacing at least one of the proximal and distal arm segments for said scientific or medical tool to be in said at least one of a predetermined position and a predetermined orientation;
wherein the articulated positioning system further comprises a tool-holding assembly mounted to the tool-holding end portion of the distal arm segment, the tool-holding assembly comprising a tool-receiving portion and first and second tool-pivoting devices having respectively first and second tool-pivoting axes intersecting perpendicularly to each other, wherein when the scientific or medical tool is engaged with the tool-receiving portion, the scientific or medical tool is pivotable about the first and second tool-pivoting axes,
wherein the method further comprises engaging said scientific or medical tool with said tool-receiving portion; and
actuating at least one of said first and second tool-pivoting devices to pivot said scientific or medical tool about the corresponding one of said first and second tool-pivoting axes.

19. The method according to claim 18,
wherein the tool-holding assembly further comprises a tool-translating device defining a tool-translating axis,
the method further comprising actuating said tool-translating device to translate said scientific or medical tool along said tool-translating axis, the tool-holding assembly comprising a third tool-pivoting device having a third tool-pivoting axis parallel to the tool-translating axis,
the method further comprising actuating said third pivoting device to pivot said scientific or medical tool about the third tool-pivoting axis.

* * * * *